(12) United States Patent
Razumov

(10) Patent No.: US 12,534,295 B2
(45) Date of Patent: Jan. 27, 2026

(54) TRACK ARRANGEMENT, AN AUTOMATED STORAGE AND RETRIEVAL SYSTEM AND AN AUTOMATED STORAGE AND RETRIEVAL METHOD

(71) Applicant: stow Robotics GmbH, Großwallstadt (DE)

(72) Inventor: Sergey Razumov, Nicosia (CY)

(73) Assignee: STOW ROBOTICS GMBH, Grosswallstadt (DE)

( * ) Notice: Subject to any disclaimer, the term of this patent is extended or adjusted under 35 U.S.C. 154(b) by 976 days.

(21) Appl. No.: 17/761,724

(22) PCT Filed: Sep. 27, 2019

(86) PCT No.: PCT/IB2019/058231
§ 371 (c)(1),
(2) Date: Mar. 18, 2022

(87) PCT Pub. No.: WO2021/059007
PCT Pub. Date: Apr. 1, 2021

(65) Prior Publication Data
US 2022/0356015 A1 Nov. 10, 2022

(51) Int. Cl.
*B65G 1/04* (2006.01)
*B65G 1/06* (2006.01)

(52) U.S. Cl.
CPC ........... *B65G 1/0492* (2013.01); *B65G 1/065* (2013.01); *B65G 2209/10* (2013.01)

(58) Field of Classification Search
CPC ... B65G 1/0492; B65G 1/065; B65G 2209/10
See application file for complete search history.

(56) References Cited

U.S. PATENT DOCUMENTS 9,821,959 B2 * 11/2017 Hognaland ............. B60L 50/64
10,435,241 B2 * 10/2019 Lert ..................... B65G 1/0478
(Continued)

FOREIGN PATENT DOCUMENTS

EP 2918519 A1 9/2015
EP 3370194 A1 9/2018
(Continued)

*Primary Examiner* — Saul Rodriguez
*Assistant Examiner* — Ashley K Romano
(74) *Attorney, Agent, or Firm* — McGlew and Tuttle, P.C.

(57) ABSTRACT

A track arrangement (1) for self-driven carriages (2) in a storage rack arrangement (3) stores and accessed objects (4). A plurality of storage sites (5) are arranged in a rack extending over k storage levels (7). The track arrangement connects each storage level (7) with at least one interaction site (10) for processing stored objects and/or issuing objects to be stored and includes Z track levels, Z≥k, an entry point (27) on the $m^{th}$ track level for each interaction site (10), m∈{1, . . . , Z}, and an exit point (28) on the $n^{th}$ track level for each interaction site, n∈{1, . . . , Z}. Each interaction site has: Z−m first one-way ramps (14) directed downward towards the entry point, m−1 second one-way ramps (16) directed upward towards the entry point, Z−n third one-way ramps (20) directed upward away from the exit point, and n−1 fourth one-way ramps (22) directed downward away from the exit point.

14 Claims, 19 Drawing Sheets

(56) References Cited

U.S. PATENT DOCUMENTS

| | | |
|---|---|---|
| 10,940,999 B2 * | 3/2021 | Kalouche ................ B25J 19/02 |
| 11,440,782 B2 * | 9/2022 | Goncalves ................ B66F 9/18 |
| 2014/0277693 A1 | 9/2014 | Naylor |
| 2017/0050803 A1 | 2/2017 | Arnold et al. |
| 2018/0032949 A1 * | 2/2018 | Galluzzo .............. B65G 1/1375 |
| 2019/0233209 A1 * | 8/2019 | Gravelle .............. B65G 1/0464 |

FOREIGN PATENT DOCUMENTS

| | | |
|---|---|---|
| FR | 2730715 A1 | 8/1996 |
| WO | 2016196815 A1 | 12/2016 |

\* cited by examiner

TRACK ARRANGEMENT, AN AUTOMATED STORAGE AND RETRIEVAL SYSTEM AND AN AUTOMATED STORAGE AND RETRIEVAL METHOD

CROSS REFERENCE TO RELATED APPLICATIONS

This application is a United States National Phase Application of International Application PCT/IB2019/058231, filed Sep. 27, 2019, the entire contents of which are incorporated herein by reference.

TECHNICAL FIELD

The present disclosure is directed to a track arrangement for self-driven carriages in a storage rack arrangement for automatically storing and accessing objects, wherein the storage rack arrangement comprises a plurality of storage sites being arranged in at least two racks extending over k storage levels, wherein the storage sites are accessible by horizontal aisle tracks on each storage level, wherein the aisle tracks extend in an aisle direction along aisles between the racks, wherein the track arrangement connects each storage site with at least one interaction site for automatically processing stored objects and/or automatically issuing objects to be stored. The present disclosure also discloses an automated storage and retrieval system and an automated storage and retrieval method.

BACKGROUND

Track arrangements for self-driven carriages are known in the prior art. Such arrangements comprise storage levels, which can be connected by a lift. A lift is comparably complex and limits the throughput of the storage and retrieval system. A track arrangement with a lift typically comprises a number of moving and thus constructively demanding parts.

US 2017/0050803A1 discloses an alternative track arrangement. To connect different storage levels with each other a belt conveyor instead of a lift is suggested. The belt conveyor conveys objects along ramped sections of the conveyor to interaction sites on a storage level, where the objects can be picked up by carriages that move along horizontal aisle tracks.

The carriages are bound to its storage level and cannot change the storage level. The object to be transported changes the storage level by means of the belt conveyor. The object to be transported needs to be handed over at least when the object is put on the belt conveyor to be moved from one storage level to another storage level, when the object is picked up by a carriage at the storage level where it is to be moved to, and potentially when the object is handed over from the carriage to the storage site. Handing over the object is time consuming, and the carriage or the belt conveyor could be idle, depending on the demand to move an object on a certain storage level.

A track arrangement with a lift and/or a belt conveyor are limited in their efficiency by idle phases of the carriages, the belt conveyor, and/or the lift when handing over objects at the belt conveyor or the lift, respectively. Thus, the carriages, the belt conveyor, and/or the lift are limited in their occupancy. The belt conveyor and the lift are constructively demanding and the cost-efficiency of such an arrangement can be improved. It is thus desirable to avoid the limitation of the complexity of a lift or a belt conveyor.

EP 3 370 194 A1 discloses a warehouse management system with ramps instead of a lift. A plurality of carriages can traverse the track arrangement on any of the storage levels. The carriages can change the storage level of the rack arrangement by ramps which connect adjacent storage levels. The tracks and the ramps are arranged so that each carriage can follow a putative best route between its current position and, e.g., an object and/or a storage site. More than one carriage can choose a route with a driving direction opposite to the driving of another carriage. Therefore, carriages can potentially crash with each other. To avoid such a crash, a carriage can recalculate and change its route. The change of a route implies that the formerly chosen putative best route has potentially not been optimal and that the carriage has chosen a route which is longer than necessary. Due to the presence of a plurality of carriages and potential online scheduling of routes by the self-driven carriages, such a potential crash can hardly be determined in advance. Due to the change of the route, the time-consumption to transport an object can increase in a manner that is hardly to be predicted. This can reduce the occupancy of the interaction site and the overall efficiency of the storage system.

SUMMARY

It is a problem of the present disclosure to transport objects efficiently in a storage rack arrangement for automatically storing and accessing objects, which is cost-effective and avoids limitations of the occupancy when transporting, storing and retrieving objects.

The problem is solved by the technical features of the present disclosure.

According to a first aspect of the present disclosure, the track arrangement comprises at least Z track levels, wherein $Z \geq k$, an entry point on the $m^{th}$ track level for each interaction site, wherein $m \in \{1, \ldots, Z\}$, and an exit point on the $n^{th}$ track level for each interaction site, wherein $n \in \{1, \ldots, Z\}$. From the entry point, the interaction site can be reached by a carriage via tracks of the track arrangement. From the exit point, the interaction site can be left by a carriage via tracks of the track arrangement. The $m^{th}$ track level is called "entry point level" and the $n^{th}$ track level is called the "exit point level". The entry point level is the track level at which a track leads from the entry point to the interaction site. The exit point level is the track level at which a track leads from the interaction site to the exit point. The track level, at which the interaction site is arranged, is called "interaction site level". All track levels, or at least a subset of them, may correspond to the k storage levels of the storage rack arrangement. However, in some embodiments, the track arrangement may comprise auxiliary intermediate track levels in addition to the track levels that correspond to the storage levels.

According to the first aspect of the present disclosure, the track arrangement further comprises for each interaction site: $Z-m$ first one-way ramps directed downward towards the entry point, $m-1$ second one-way ramps directed upward towards the entry point, $Z-n$ third one-way ramps directed upward away from the exit point, and $n-1$ fourth one-way ramps directed downward away from the exit point. Therein, a one-way ramp is a ramped track. A first one-way ramp is a ramped one-way track that extends from track level Z downward to $Z-1$, from $Z-1$ to $Z-2$, ..., and from $Z-m+1$ to $Z-m$. A second one-way ramp is a ramped one-way track that extends upward from track level 1 to 2, from 2 to 3, ..., and from $m-1$ to $m$. A third one-way ramp is a ramped one-way track that extends upward from track level n to n+1, from n+1 to n+2, . . . , and from Z−1 to Z. A fourth one-way ramp is a ramped one-way track that extends downward from track level n to n−1, from n−1 to n−2, . . . , and from 2 to 1.

The one-way ramps ensure that a carriage can change track levels effectively. A carriage on a track level can access any other track level by choosing a path along one or more of the one-way ramps which leads to the chosen storage level. A carriage can transport an object over one or more storage levels from the interaction site to a storage site, or from a storage site to the interaction site by the one-way ramps. i.e. a potentially time-consuming handing over of objects can be dispensed with. The throughput of the track arrangement is determined by the tracks and the carriages and is not limited by other transportation means, e.g. by a lift or a belt conveyor, and/or a carriage that is idle when waiting for said other transportation means. Thereby, the complexity and the construction of the track arrangement is comparably simple and comprises only one or more carriages as movable parts which makes the track arrangement cost-effective.

The one-way ramps ensure that there is at least one first path, i.e. a route that a carriage can take, between a storage level and the interaction site so that an object can be moved from a storage site to the interaction site and at least one second path between the interaction site and any storage level so that an object can be moved from the interaction site to a storage site. This reduces the risk of a potential crash and therefore of a recalculation and change of a route.

Optionally, for each interaction site, the entry point and the exit point may be arranged at an identical track level. In this embodiment, the interaction site can be reached from the same track level from where the interaction site can be left. This is particularly efficient, when an object is to be stored at and/or picked up from the storage level at which the interaction site is arranged. In this embodiment, the entry point level and the exit point level are identical per interaction site to improve the efficiency of the layout and construction of the track arrangement. In an alternative embodiment, the entry point level can be different from the interaction site level. This can be particularly effective to provide a path without the risk of a collision, e.g. when the track arrangement comprises exactly one route via one-way ramps between the entry point and the interaction site.

Optionally, one or more of the first one-way ramps, of the second one-way ramps, of the third one-way ramps, and/or of the fourth one-way ramps may be arranged to connect adjacent track levels with each other. This embodiment provides a track arrangement that allows a carriage to move directly from one track level to an adjacent track level, i.e. from a track level n∈{1, . . . , Z} to an upper track level n+1∈{1, . . . , Z} and/or to a lower track level n−1∈{1, . . . , Z}. This embodiment comprises shortest possible paths between adjacent storage levels.

Optionally, one or more of the first one-way ramps, of the second one-way ramps, of the third one-way ramps, and/or of the fourth one-way ramps may be arranged to connect next-nearest track levels with each other and/or at least two track levels with each other having two or more track levels between said connected at least two track levels. i.e. such a one-way ramp extends over at least three track levels but does not need to connect adjacent track levels. This embodiment provides a track arrangement that allows a carriage to move directly from one track level to a track level with at least one track level in between, i.e. from a track level n∈{1, . . . , Z} to an upper storage level n+s∈{1, . . . , Z}, s≥2 and/or to a lower storage level n−s∈{1, . . . , Z}, s≥2. This embodiment can be particularly effective in providing a path to prevent a potential collision of carriages which improves the efficiency of transportation.

Optionally, the first one-way ramps may comprise a first sequence of first ramps, the second one-way ramps may comprise a second sequence of second ramps, the third one-way ramps may comprise a third sequence of third ramps and/or the fourth one-way ramps may comprise a fourth sequence of fourth ramps. Preferably, a sequence of ramps may be a plurality of one-way ramps, wherein an exit point of one one-way ramp is identical to or close to an entry point of a subsequent one-way ramp. i.e., a carriage can move along the sequence of ramps while traversing said one-way ramps without traversing longer tracks other than said one-way ramps. Advantageously, each subsequent pair of one-way ramps of a sequence of ramps is connected with each other by one or two horizontal connection points. A sequence of ramps improves the efficiency of transporting an object from one level to another level by passing one or more levels in between.

Optionally, the track arrangement may comprise a plurality of interaction sites to issue and/or retrieve a plurality of objects preferably with a plurality of carriages simultaneously. The interaction sites can be arranged at an identical track level. Alternatively, at least two interaction sites can be arranged at different track levels which can improve the performance of the automated storage and retrieval system, e.g. when one interaction site is arranged near storage sites which are accessed more frequently than other storage sites further away from said interaction site.

Optionally, a first subset of first one-way ramps, a second subset of second one-way ramps, a third subset of third one-way ramps, and/or a fourth subset of fourth one-way ramps may be configured to connect any one of the storage sites with exactly one interaction site. The first subset of first one-way ramps may comprise preferably Z−m first one-way ramps directed downward towards the entry point of the interaction that it connects to. It is possible that the track arrangement comprises a plurality of first subsets of first one-way ramps, wherein any two first subsets of first one-way ramps are configured to connect to different interaction sites. The second subset of second one-way ramps comprises preferably m−1 second one-way ramps directed upward towards the entry point. The third subset of third one-way ramps comprises preferably Z−n third one-way ramps directed upward away from the exit point. The fourth subset of fourth one-way ramps comprises preferably n−1 fourth one-way ramps directed downward away from the exit point. Similarly, as explained with reference to the first subset of first one-way ramps, the track arrangement can comprise a plurality of second subsets of second one-way tracks, third subsets of third one-way tracks and/or fourth subsets of fourth one-way tracks, wherein any two of said subsets of one-way ramps are configured to connect to different interaction sites. This is particular effective since the risk of collisions of carriages on the routes from an entry point and its interaction site can be significantly reduced.

Optionally, for each interaction site, the first subset of first one-way ramps, the second subset of second one-way ramps, the third subset of third one-way ramps, and/or the fourth subset of fourth one-way ramps may be configured to connect any one of the storage sites with exactly one interaction site. This embodiment reduces the risk of collisions of carriages and provides the possibility of a modular arrangement of the track arrangement. i.e. the subsets of one-way ramps and the corresponding interaction sites can be repeated transversely to the aisle direction periodically along the rack arrangement, wherein each periodic repetition can comprise one or more of said subsets of one-way ramps and one or more interaction sites.

Optionally, the track arrangement may comprise at least one bidirectional horizontal track connectable to all aisle tracks on each storage level. The bidirectional horizontal track can connect any aisle track with connection points, wherein a connection point connects the bidirectional horizontal track to one or more one-way ramps. i.e. a carriage can drive a path between a storage site and the interaction site by traversing the horizontal aisle track, the horizontal bidirectional track and one or more of the one-way ramps. The bidirectional horizontal track can connect one or more aisle tracks with one or more of the one-way ramps to provide a plurality of possible paths for the carriages.

Optionally, the track arrangement may comprise a first horizontal one-way track connectable to all aisle tracks on each storage level in a first driving direction. The first horizontal one-way track may prevent that carriages crash during traversing the horizontal one-way track. Therefore, a carriage can choose an optimal route, e.g. between the interaction site and the storage site. A recalculation and change of a route of a carriage can be dispensed with, which improves the efficiency of transportation of an object.

Optionally, the track arrangement may comprise a second horizontal one-way track connectable to all aisle tracks on each storage level in a second driving direction opposite to the first direction. The two horizontal one-way tracks of the track arrangement allow a movement of a carriage in any horizontal direction transverse to the aisle direction to move towards or away from an aisle efficiently on an optimal route.

Optionally, on at least one storage level, the bidirectional horizontal track, the first horizontal one-way track and/or the second horizontal one-way track may extend transversely to the aisle direction to improve the construction of the track arrangement by providing a space-saving embodiment, which allows for short paths. This embodiment is particularly space saving in the aisle direction at a front face of the rack arrangement at which the track arrangement is arrangeable.

Optionally, the bidirectional horizontal track, the first horizontal one-way track and/or the second horizontal one-way track may be arranged, in the aisle direction, between the aisle tracks and any of the first, second, third, and/or fourth one-way ramps. This embodiment comprises the minimum number of cross-sections of tracks and thereby provides a track arrangement with a minimum chance that two paths of carriages cross each other simultaneously.

Optionally, the first one-way ramps, the second one-way ramps, the third one-way ramps, and/or the fourth one-way ramps may have a driving direction transverse to the aisle direction to allow an effective arrangement of the one-way tracks that is space-saving and provides short paths.

Optionally, the track arrangement may comprise at least one connection track, wherein the connection track extends in aisle direction. The connection track(s) may be bidirectional or unidirectional. The connection track may extend along the aisles to allow a carriage to drive towards and away from a storage site at the same section of the aisle track. In this embodiment, the track arrangement can be arranged at one face, e.g., the front face, of the rack arrangement. The connection track can extend outside an aisle to provide an efficient change of different tracks.

Optionally, the at least one connection track may comprise at least one connection point, wherein the connected point connects at least two of the following with each other: one or more horizontal tracks, one or more one-way ramps, and/or the interaction site. i.e., a connection point is a horizontal track section, which connects different parts of the track arrangement, e.g., ramps and/or horizontal tracks, with each other. By aligning at least one connection point at a connection track an effective change of different tracks is possible. Preferably, a connection track comprises a plurality of connection points to allow an effective change between a plurality of different tracks on a shortest path.

Optionally, subsequent first one-way ramps may be connected to each other by one or two horizontal connection points and/or subsequent second one-way ramps may be connected to each other by one or two horizontal connection points, and/or subsequent third one-way ramps may be connected to each other by one or two horizontal connection points, and/or subsequent fourth one-way ramps may be connected to each other by one or two horizontal connection points. A pair of subsequent ramps may be connected by means of the connection point without any further horizontal track between said ramps. In this embodiment, subsequent ramps are connected so that a path along subsequent ramps between multiple levels has a short length.

Optionally, any connection point may be arranged on a three-dimensional grid, i.e. each connection point may define a grid point of the three-dimensional grid. This embodiment can improve the layout of the track arrangement and simplify the navigation and/or coordination of one or more carriages. The grid provides well defined coordinates at grid points where connection points can be located. Not any of the grid points needs to comprise a connection point. i.e., the grid can comprise a grid point without a connection point.

Optionally, the grid may comprise Z track levels, Y track rows, and X track columns, wherein X, Y, Z∈ℕ wherein each track row extends horizontally and transverse to the aisle direction, and each track column extends vertically to provide an alignment of the grid and the track arrangement. Thus, a sequence of track rows extends horizontally along the aisle direction, whereas a sequence of track columns extends horizontally transversely to the aisle direction. The track columns may be connected to each other by the ramps. If the length of the ramps is L and the slope angle of the ramps is a, the distance D between the track columns may be $D = L \cdot \sin \alpha$.

Optionally, the number of track levels may equal the number of storage levels, i.e. Z=k, at each storage level, at least one connection point is potentially arranged. However, in some embodiments, the track arrangement may comprise auxiliary intermediate track levels in addition to the track levels that correspond to the storage levels, i.e. Z>k. The number of track rows is preferably three to five to provide a space-saving embodiment. An embodiment with three track rows may comprise on each level a bidirectional horizontal track in a first track row closest to the storage rack arrangement, one-way ramps with a positive slope angle in a second track row, and one-way ramps with a negative slope angle in a third track row. Alternatively, the second track row may comprise one-way ramps with a negative slope angle, whereas the third track row may comprise one-way ramps with a positive slope angle. An embodiment with four track rows may comprise on each level a first unidirectional horizontal track in a first horizontal driving direction transverse to the aisle direction in the first track row and a second unidirectional horizontal track in a second horizontal driving direction opposite the first horizontal driving direction in the second track row. The third track row may comprise one-way ramps with a positive(negative)

slope angle, whereas the fourth track row may comprise one-way ramps with a negative(positive) slope angle. An embodiment with five track rows may be similar to the embodiment with four track rows, but an additional track row may comprise on each level a bidirectional horizontal track for adapting the distance between track columns of the track arrangement (determined by the ramp length and the ramp slope angle) to the distance between aisles of the storage rack arrangement. Preferably, the number of track columns equals the number of levels in order to reduce the number directional changes of the carriages. If the number of track columns must be chosen to be less than the number of levels, for example due to lateral space limitations, a path along a sequence of ramps may include turns of 180 degrees via two adjacent connection points including a transfer to the adjacent track row. Preferably, the entry point and exit point of an interaction site are arranged at adjacent track columns on the same level. A "180-degree turn" on a one-way path shall mean herein that the carriage changes to the opposite driving directing by two subsequent 90-degree turns at two adjacent connection points to change to another unidirectional or bidirectional track allowing the opposite driving direction. This means that the carriage must change the track row during a 180-degree turn on a one-way path.

Optionally, between each pair of adjacent track columns one or more (up to Y–1) one-way ramps with a positive slope angle may be arranged in one track row, and between the same pair of adjacent track columns the same number of ramps with a negative slope angle may be arranged in an adjacent track row. The ramps of the same track row may be preferably arranged essentially in parallel to each other. These embodiments each provide a track arrangement with an improved usage of constructive space in the aisle direction.

Optionally, at least one of the first one-way ramps, second one-way ramps, third one-way ramps, and/or fourth one-way ramps may have a slope angle of 5 to 20 degrees, preferably 12 to 17 degrees. For example, at least one of the ramps may have a slope angle of 15 degrees. This embodiment provides a slope angle so that each ramp is effectively drivable by a carriage and requires a preferred amount of constructive space in horizontal direction to connect different storage levels. Preferably, the absolute amount of the slope angle of all ramps is essentially the same. Preferably, the sign of the slope angle is essentially the same for all ramps of the same track row and different between ramps of adjacent track rows. Preferably, the all ramps have essentially the same length. Thereby, the ramps may all be identical to each other to reduce the diversity of parts the track arrangement is composed of.

Optionally, the at least one interaction site may comprise a charger module for charging a battery of a carriage during automatically processing a stored object and/or automatically issuing an object to be stored. In this embodiment, a carriage can be charged during handing over an object to and/or from the carriage. The time during a stored object is processed and/or an object to be stored is issued is thereby used effectively. Preferably, this time is sufficient to charge the battery to last until the carriage returns to a charger module next time, so that the carriage does not any extra pauses to charge its battery.

Optionally, the track arrangement may comprise a one-way interaction track to connect the entry point of the interaction site with the at least one interaction site and the at least one interaction site with the exit point of the interaction site. This embodiment improves the connection of the interaction site with other tracks of the track arrangement. The one-way interaction track prevents potential collision of carriages that drive towards or away from the interaction site. Preferably, the interaction track is a loop which leads from the entry point via the interaction site to the exit point. The loop is preferably closed by the first horizontal one-way track and/or the second horizontal one-way track. Optionally, the one-way interaction track comprises and/or is a horizontal track.

Optionally, the track arrangement may be arranged so that it can be scaled and extended as desired by one or more levels and/or track columns of the track arrangement. Thus, the track arrangement may be comprised of a modular construction kit comprising ramps, horizontal tracks and connection points. The size and layout of such a track arrangement can be adjusted to the storage rack arrangement by choosing the most appropriate number of track columns and ramps per track column.

Optionally, the track arrangement may comprise an optical marker, an electrical tag and/or a lane marking so that a carriage can detect its position and/or check/improve its position information. Preferably, the carriage may comprise a detection device which is adapted to detect a marker, tag and/or marking of any of the one-way tracks. For example, the carriage may comprise a camera to detect an optical marker and/or lane marking, and/or an RFID reader to read an electrical tag. A marker, tag, and/or marking can be arranged in and/or at a track bed of a track which are configured to guide the carriages along said track.

According to another aspect of the present disclosure, an automated storage and retrieval system is provided comprising the aforementioned track arrangement and at least one self-driven carriage being configured to drive along a defined first path along one-way ramps of the track arrangement for automatically transporting a stored object from a storage site to an interaction site and/or to drive along a defined second path along one-way ramps of the track arrangement for automatically transporting an object from the interaction site to a storage site. The at least one carriage may comprise a battery to power a drive motor of the carriage and preferably to be charged by a charging module which may be located at the interaction site; a detection device which is adapted to detect a marker, tag and/or marking of any of the one-way tracks; and a driving arrangement to interact with the tracks, e.g. the driving arrangement may comprise wheels with a lateral distance and wheelbase that fits the tracks and ramps of the track arrangement.

Optionally, the at least one carriage may comprise a first wheel set of four wheels for driving fourth and back in the aisle direction and a second wheel set of four further wheels for driving fourth and back transversely to the aisle direction and for driving the ramps upward/downward. The driving direction of the first wheel set differs from the driving direction of the second wheel set by 90 degrees. At least one of the first wheel set and the second wheel set may be vertically lowered and lifted relative to the other wheel set, so that the lower wheel set is the active wheel set for driving while the upper wheel set is the idle wheel set. The driving direction may be changed at connection points of the track arrangement by changing the active wheel set, i.e. by lowering the idle wheel set and/or lifting the active wheel set.

Optionally, the track arrangement is arranged at a front face of the storage rack arrangement to provide a space-saving construction of the automated storage and retrieval system.

According to another aspect of the present disclosure, an automated storage and retrieval method is provided, the method comprising the steps of: retrieving a stored object from a storage site by a self-driven carriage, wherein the storage site is located in a storage rack arrangement comprising a plurality of storage sites being arranged in at least two racks extending over a plurality of storage levels, wherein the storage sites are accessible by horizontal aisle tracks on each storage level, wherein the aisle tracks extend in an aisle direction along aisles between the racks, transporting the object from the storage site by the self-driven carriage via first one-way ramps and/or second one-way ramps to an entry point of an interaction site for automatically processing the stored object, and/or transporting the object from an exit point of the interaction site by the self-driven carriage via third one-way ramps and/or fourth one-way ramps to one of the storage sites for automatically storing the object.

Optionally, a route of a carriage between an interaction site and a storage site, and/or between a storage site and an interaction site may be determined by determining a sequence of connection points and/or tracks of the track arrangement that are to be traversed by said carriage. The sequence of connection points can be determined, represented, processed and/or stored by a sequence of grid points at which the connection points can be located. The sequence of ramps can be determined, e.g., by lane markings, and/or are by the direction of a track which can be a one-way track traversable in only one direction.

Optionally, a route of a carriage between an interaction site and a storage site, and/or between a storage site and an interaction point may be determined by determining a sequence of grid points of a three-dimensional grid that are to be traversed by said carriage. The sequence of grid points can be determined, represented, processed and/or stored by a sequence of grid points at which connection points can be located. Optionally, the sequence of grid points can comprise such one or more grid points that a sequence of ramps can be determined, e.g., by lane markings, and/or are by the direction of a track which can be a one-way track traversable in only one direction.

BRIEF DESCRIPTION OF THE DRAWINGS

Embodiments of the present disclosure will now be described by way of example with reference to the following figures of which.

DESCRIPTION OF PREFERRED EMBODIMENTS

Figure 1:
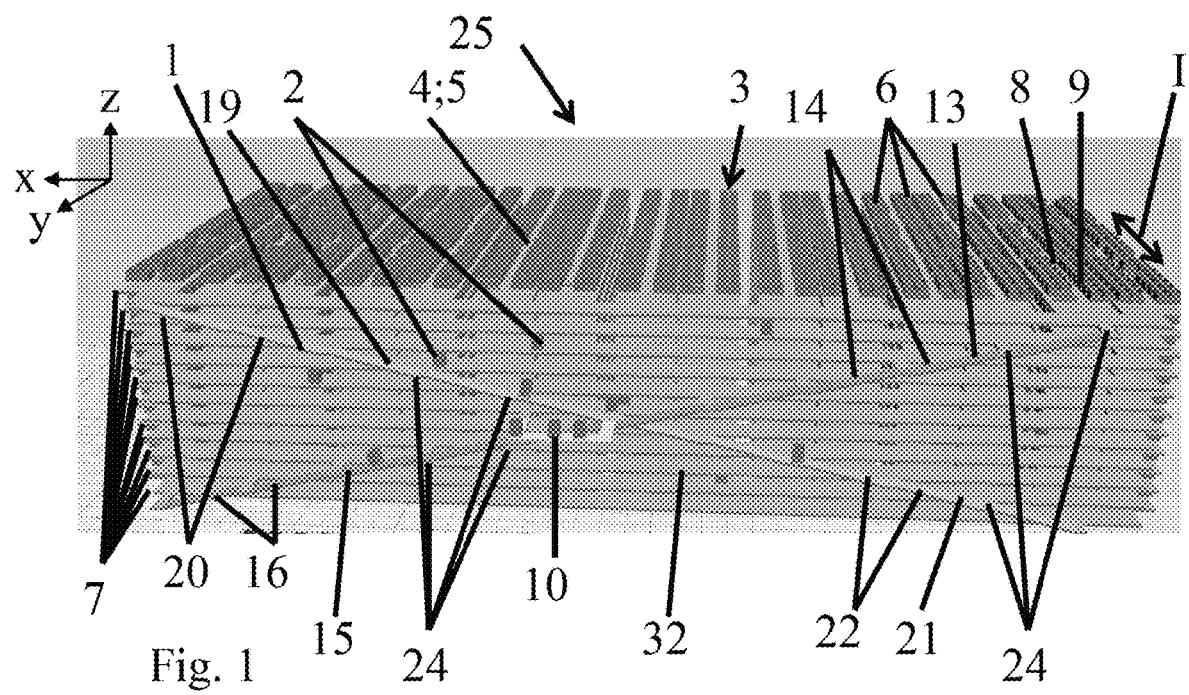
FIG. 1 is a perspective view showing an automated storage and retrieval system according to an embodiment of the present disclosure.

FIG. 1 shows an automated storage and retrieval system 25 according to an embodiment of the present disclosure. The automated storage and retrieval system 25 comprises a track arrangement 1 arranged in and/or at a rack arrangement 3, in particular at a front face 32 of the rack arrangement 3, and a plurality of self-driven carriages 2. The track arrangement 1 is configured so that a plurality of self-driven carriages 2 can drive along the track arrangement 1, e.g. by comprising tracks having a track width that allows an efficient and stable driving of the carriages 2.

The storage rack arrangement 3 for automatically storing and accessing objects 4 comprises a plurality of storage sites 5 being arranged in a plurality of racks 6 extending over a plurality of k storage levels 7. The storage sites 5 are accessible by horizontal aisle tracks 8 on each storage level 7, wherein the aisle tracks 8 extend in an aisle direction I along aisles 9 between the racks 6. The racks 6, the aisles 9, and the aisle tracks 8 extend parallel to each other so that the aisle directions I of any pair of adjacent aisles 9 are parallel to each other. Preferably, the storage sites 5 are arranged on a three-dimensional grid. All figures comprise a right-handed Cartesian coordinate system with a vertical z-axis, a forward y-axis, and a lateral x-axis. Therefore, the aisle direction I is directed along the y-axis.

The track arrangement 1 connects each storage site 5 with an interaction site 10 for automatically processing stored objects 4 and/or automatically issuing objects 4 to be stored. The track arrangement comprises in this embodiment as many track levels as storage levels, i.e. Y=k, wherein the track levels correspond to the storage levels. The interaction site 10 is arranged at a track level that may be denoted as "interaction site level" and is more detailed with reference to FIG. 2. In an alternative embodiment, the track arrangement 1 can comprise a plurality of interaction sites 10 and/or can connect each storage site 5 with a plurality of interaction sites 10. This can improve the throughput of the automated storage and retrieval system 25 and provide shorter paths between an interaction site 10 and any of the storage sites 5.

As shown in FIG. 1, the track arrangement 1 comprises first one-way ramps 14, second one-way ramps 16, third one-way ramps 20, and fourth one-way ramps 22 so that any pair of adjacent storage levels 7 is connected with each other. Advantageously, the first, second, third, and fourth one-way ramps 14, 16, 20, 22 connecting all Y track levels of the rack arrangement 3. Thereby, a carriage 2 can reach any storage level 7 from an adjacent storage level 7. The track arrangement 1 is detailed with reference to FIG. 2.

Figure 2:
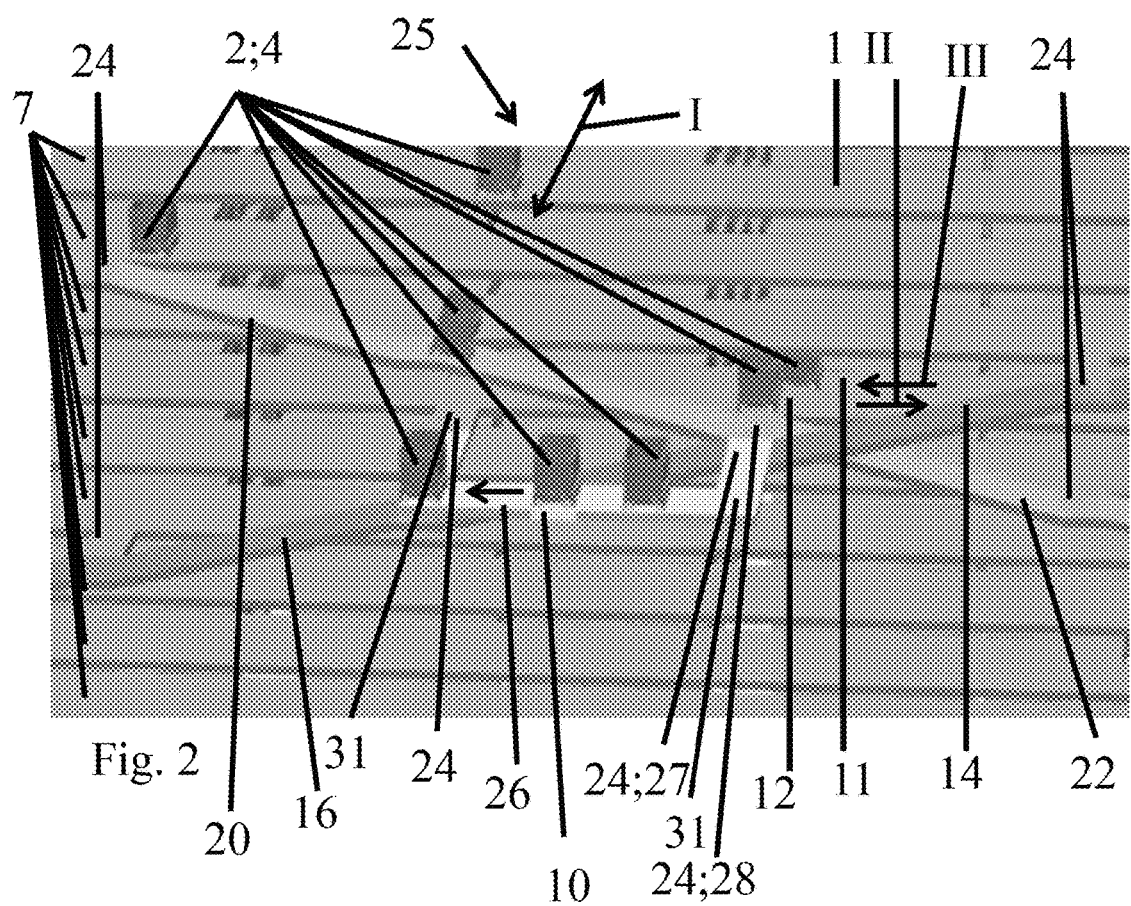
FIG. 2 is a perspective view showing an enlarged section of the storage and retrieval system of FIG. 1.

FIG. 2 shows an enlarged section of the storage and retrieval system 25 of FIG. 1. The track arrangement 1 comprises a first horizontal one-way track 11 connectable to all aisle tracks 8 on each storage level 7 in a first driving direction II (negative x-direction), and a second horizontal one-way track 12 connectable to all aisle tracks 8 on each storage level 7 in a second driving direction III (positive x-direction) opposite to the first direction II (negative x-direction). The aisle tracks 8 are bidirectional tracks extending along the y-axis. In an alternative embodiment, the track arrangement 1 can comprise one-way aisle tracks 8.

The track arrangement 1 comprises a plurality of connection tracks 31 extending along the y-axis, wherein the connection tracks 31 provide connections between the aisle tracks 8 and the first horizontal one-way track 11 and/or the second horizontal one-way track 12. The connection track 31 serves as a track junction at one or more connection points 24 and is configured to being traversed by a carriage 2, wherein the carriage 2 can keep and/or change its driving direction, preferably by 90 degrees, 180 degrees and/or 270 degrees at any of the connection points 24. The connection tracks 31 are in this embodiment unidirectional, but one or more of the connection tracks 31 may be bidirectional in other embodiments. The connection tracks 31 may be composed of a plurality of connection points 24.

The connection tracks 31 extend in aisle direction I (along the y-axis), and parallel to each other. The connection tracks 31 each comprise a plurality of connection points 24 to connect the horizontal tracks 11, 12 and/or the one-way ramps 14, 16, 20, 22 with each other. One of the connection tracks 31 extends from the first horizontal track 11 via the second horizontal track 12 and the exit point 28 to the entry point 27. Thereby, the connection track 31 connects the first horizontal track 11, the second horizontal track 12, the exit point 28, and the entry point 27, so that a carriage 2 can move from one of said tracks 11, 12 and/or one-way ramps 14, 16, 20, 22 to another.

All first one-way ramps 14 and second one-way ramps 16 lead toward an entry point level 17 (not indicated in FIG. 2) of the at least one interaction site 10. All third one-way ramps 20 and fourth one-way ramps 22 lead away from an exit point level 18 (not indicated in FIG. 2) of the at least one interaction site 10. The interaction site 10 can be accessed from the entry point level 17 and left from the exit point level 18. The entry point level 17 is the track level at which the interaction site 10 can be reached by a carriage 2. In this embodiment, a carriage 2 can reach the interaction site 10 from the entry point level 17 without changing the track level on which it drives, i.e. the entry point level 17 is the interaction site level. The entry point level 17 and the exit point level 18 are here identical for the interaction site 10, i.e. the entry point 27 and the exit point 28 are arranged at the same track level, namely at the track level at which the interaction site 10 is arranged, i.e. the interaction site level.

In this embodiment, the exit point level 18 is the track level from where the track level, at which the interaction site 10 is arranged, can be left via a third one-way ramp 22 and a fourth one-way ramp 22. The first one-way ramp 14 and the second one-way ramp 16 that leads to the entry point level 17 connects an adjacent track level with the entry point level 17 at an entry point 27 of the interaction site 10 from which the interaction site 10 can be reached by a carriage 2. The entry point 27 is arranged at the entry point level 17. The exit point level 18 is connected at an exit point 28 of the interaction site 10 via a third one-way ramp 20 and a fourth one-way ramp 22 to an adjacent track level 7, wherein the exit point 28 is arranged in the exit point level 18.

As also shown in FIG. 1, the first one-way ramps 14 comprise a first sequence of first ramps 13, the second one-way ramps 16 comprise a second sequence of second ramps 15, the third one-way ramps 20 comprise a third sequence of third ramps 19 and/or the fourth one-way ramps 22 comprise a fourth sequence of fourth ramps 21. Subsequent one-way ramps 14, 16, 20, 22 of the first, second, third or fourth sequence of ramps 13, 15, 19, 21, respectively, are connected to each other by one or two horizontal connection points 24. In this embodiment, the first, second, third or fourth sequence of ramps 13, 15, 19, 21 is arranged so that a carriage 2 can traverse any of said sequence of ramps 13, 15, 19, 21 without turns of 180 degrees between ramps. If the available lateral space does not allow for such a wide track arrangement, the sequences of ramps 13, 15, 19, 21 may include one or more turns of 180 degrees via two connection points.

As shown in FIG. 2, the track arrangement 1 comprises a one-way interaction track 26 to connect the entry point 27 of the interaction site 10 with the interaction site 10 and the interaction site 10 with the exit point 28 of the interaction site 10. The entry point 27 and the exit point 28 coincide with connection points 24 which connect to a first, second, third, and fourth one-way ramp 14, 16, 20, 22. In this embodiment, when the entry point 27 and the exit point 28 are arranged at the interaction site level, the one-way interaction track 26 is horizontal and part of a closed one-way loop, wherein the loop is closed by the second horizontal track 12. In other embodiments, the one-way interaction track 26 can comprise a first, second, third, fourth one-way ramp 14, 16, 20, 22.

In this embodiment, the first one-way ramps 14 with a horizontal component of a driving direction, transverse to the aisle direction I, towards the entry point 27 and the second one-way ramps 16 with the opposite horizontal component of a driving direction, transverse to the aisle direction I, towards the entry point 27 have essentially the same distance, in the aisle direction I, to the front face 32 of the storage rack arrangement 3. The third one-way ramps 20 with a horizontal component of a driving direction, transverse to the aisle direction I, away from the exit point 28 and the fourth one-way ramps 22 with the opposite horizontal component of a driving direction, transverse to the aisle direction I, away from the exit point 28 have essentially the same distance, in the aisle direction I, to a the front face 32 of the storage rack arrangement 3. The first one-way ramps 14 and the second one-way ramps 16 have a distance, in the aisle direction I, to the first horizontal one-way track 11 different from the distance, in the aisle direction I, of the third one-way ramps 20 and the fourth one-way ramps 22 to the first horizontal one-way track 11. This means that the first one-way ramps 14 and the second one-way ramps 16 are arranged in one row of tracks, whereas the third one-way ramps 20 and the fourth one-way ramps 22 are arranged in another row of tracks. The track rows of the track arrangement 1 may be counted in forward y-direction, so that the first horizontal one-way track 11 is here located in the first track row, the second horizontal one-way track 12 is located in the second track row, the third/fourth one-way ramps 20, 22 are located in the third track row, and the first/second one-way ramps 14,16 are located in the fourth track row.

The first horizontal one-way track 11 and the second horizontal one-way track 12 extend essentially parallel to each other and transversely to the aisle direction I. The first horizontal one-way track 11 and the second horizontal one-way track 12 are arranged, in the aisle direction I, between the aisle tracks 8 and the ramped one-way tracks 14, 16, 20, 22.

The self-driven carriages 2 are configured to drive a defined first path along one-way tracks 11, 12, 26 and first and second one-way ramps 14, 16 of the track arrangement 1 for automatically transporting a stored object 4 from a storage site 5 to an interaction site 10. The self-driven carriages 2 are configured to drive a defined second path along the one-way tracks 11, 12, 26 and third and fourth one-way ramps 20, 22 of the track arrangement 1 for automatically transporting an object 4 from the interaction site 10 to a storage site 5. Therein, the first path and the second path can comprise common tracks 11, 12, 26, but no common ramps. Preferably, the automated storage and retrieval system 25 comprises a one or a plurality of carriages 2.

Figure 3:
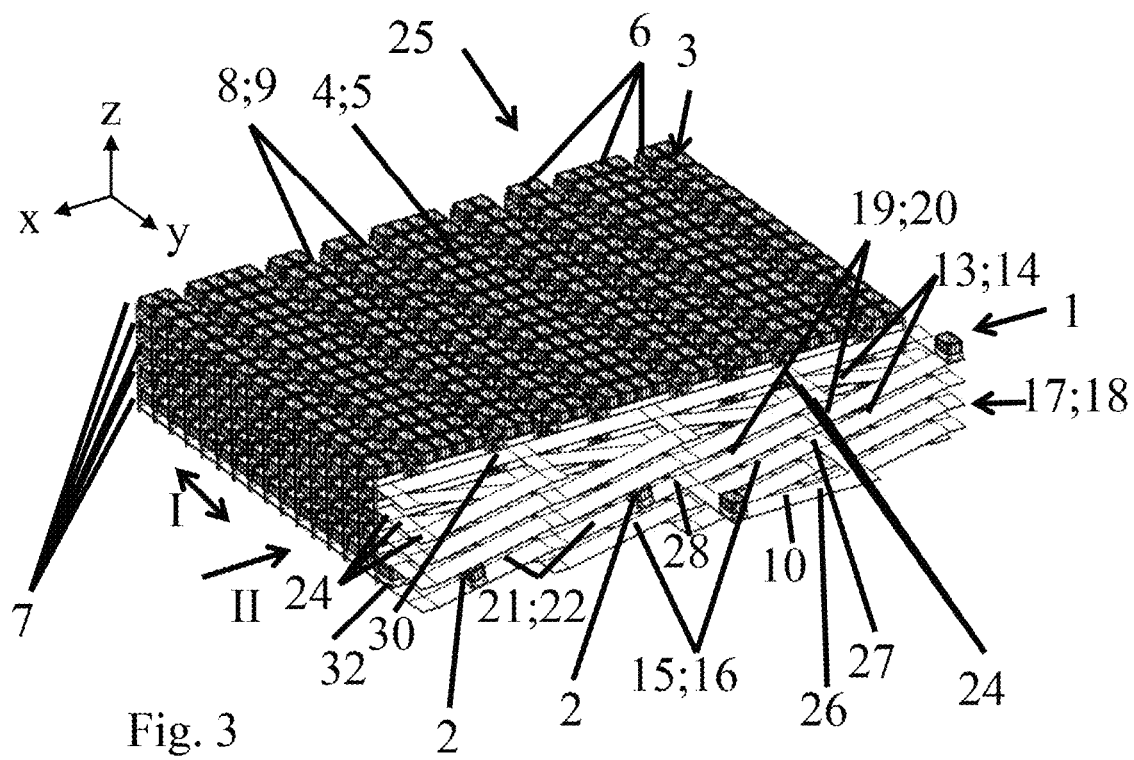
FIG. 3 is a perspective view of an embodiment according to the present disclosure, comprising one bi-directional horizontal track on each storage level.

FIG. 3 shows a perspective view of an embodiment of an automated storage and retrieval system 25 and a track arrangement 1 according to the present disclosure, comprising exactly one bidirectional horizontal track 30 connectable to all aisle tracks 8 on each storage level 7. The automated storage and retrieval system 25 is described with reference to the embodiment which is shown in FIGS. 1 and 2, wherein the differences are detailed.

At any storage level 7, the bidirectional horizontal track 30 enables a carriage 2 to move, on the same storage level 7, from any aisle track 8 to another aisle track 8. The bidirectional horizontal track 30 extends transversely to the aisle direction I. The bidirectional horizontal track 30 is arranged, in the aisle direction I, between the aisle tracks 8 and the first, second, third, and/or fourth one-way ramps 14, 16, 20, 22. In the aisle direction I, the track arrangement 1 extends with a depth in y-direction of three track widths, i.e. the width of three connection points 24.

The bidirectional horizontal track 30 is bidirectional to provide short paths between the interaction site 10 and any of the storage sites 5. In an alternative embodiment, the track arrangement 1 comprises first and second horizontal one-way tracks 11, 12 as shown in FIGS. 1 and 2 instead of one bidirectional horizontal track 30 to prevent any potential collision of carriages 2 when moving along the said track and/or to provide a unique first path and/or second path.

The track arrangement 1 comprises a plurality of first sequences 13 of first one-way ramps 14, a plurality of second sequences 15 of second one-way ramps 16, a plurality of third sequences 19 of third one-way ramps 20, and a plurality of fourth sequences 21 of fourth one-way ramps 22. Thereby, the track arrangement 1 comprises a plurality of first paths from any of the storage sites 5 to the interaction site 10, and a plurality of second paths from the interaction site 10 to any of the storage sites 5. This can increase the possible throughput of the automated storage and retrieval system 25.

In FIG. 3, the interaction level is the third level with the entry point 27 and an exit point 28 on the third level. The track arrangement 1 comprises a plurality of first, second, third, and fourth sequences of one-way ramps 13, 15, 19, 21, wherein each sequence comprises two one-way ramps 14, 16, 20, 22 to reach all five levels of the track arrangement. The second sequence 15 comprises two second one-way ramps 16 directed upward to the right and arranged in the same track row below and left of the entry point 27. The third sequence 19 comprises two third one-way ramps 20 directed upward to the right and arranged in the same track row track row above and right of the exit point 28. The fourth sequence 21 comprises two fourth one-way ramps 22 directed downward to the left and arranged in the same track row below and right of the exit point 28. The first sequence 13 differs from the other sequences 15, 19, 21 in that there is not sufficient lateral space to right from the entry point for the carriage to descend from the fifth top level. Therefore, one first one-way ramp 14 of the first sequence 1 between the fourth and third level is directed downward to the left and arranged above and right of the entry point 27 in the same track row of the entry point 27. The other first one-way ramp 14 of the first sequence 13 between the fifth and fourth level is directed downward to the right and arranged in a different track row than the entry point 27. Therefore, the path of a carriage along the first sequence 13 implies a 180-degree turn between the two first one-way ramps 14. The available lateral space and the position of the entry point 27 and/or exit point 28 in the track arrangement 1 determine if and how many such 180-degree turns may be needed in which sequence. The layout of the track arrangement 1 may be chosen to minimise the number of 180-degree turns as much as possible. However, if need be, the first, second, third, and/or fourth sequences 13, 15, 19, 21 may comprise a plurality of 180-degree turns and may thus define a zig-zag-shaped path.

In all shown embodiments, the track arrangement 28 is arranged on a three-dimensional grid, wherein the connection points 24, entry point 27 and/or exit point 28 define grid points. The grid comprises Z track levels, Y track rows, and X track columns. The track rows extend transverse to the aisle direction I (along x-axis), so that a sequence of track rows extends in the aisle direction (along y-axis). The track columns are defined by a sequence of connection points 24 vertically arranged above each other (along z-axis), so that a sequence of track columns extends transverse to the aisle direction (along x-axis). The one-way ramps 14, 16, 20, 22 connect adjacent track columns and levels which each other. The number Z of track levels equals here the number k of storage levels 7, i.e. k=5 in FIG. 3. The number of track rows Y equals the maximum number of connection points 24 of a connection track 31 in aisle direction I, i.e. Y=3 in FIG. 3. Additionally, some space in aisle direction I, may be provided for arranging the interaction track 26 and the interaction site 10. In FIG. 3, the number X of track columns equals the number Z of track levels. This is particularly advantageous to reduce the number of needed 180-degree turns. However, the carriages 2 may only be able to securely climb/descend ramps with a slope angle of less than $\alpha_{max}$, so that a minimum track column distance $D_{min}$ may be needed to climb one level height H, wherein $$D_{min} = \frac{\tan\alpha_{max}}{H}.$$

If the available lateral space does not allow a layout of the track arrangement with at least X track columns, the number X of track columns can be reduced down to a minimum number X of 2 at the cost of more 180-degree turns. Preferably, the driving direction of ramps of the same track row connecting the same track columns alternates between adjacent levels. Preferably, the driving direction of ramps between the same levels and connecting the same track columns differs between the track rows. Preferably, the driving direction of ramps connecting the same levels in the same track row alternates between adjacent track columns.

The number Y of track rows is counted from the front face 32 of the rack arrangement 3 forward in x-direction, so that the bidirectional horizontal track 30 in FIG. 3 is arranged in track row number one. The number Z of track levels equals the number k of the storage levels 7, wherein the bottom storage level has level number one and the top level has level number five in FIG. 3. In FIG. 3, the number of track columns X is five, wherein the first track column on the right is track column number one, the entry point 27 is in track column number two, and the exit point 28 is in the central third track column. Preferably, the entry point 27 and the exit point 28 are arranged in adjacent track columns. Preferably, the entry point 27 and the exit point 28 are arranged on the same track level.

In all shown embodiments, the ramps of the same track row are arranged essentially in parallel to each other, i.e. each extending from bottom left to top right or vice versa, or each leading from top left to bottom right or vice versa. In FIG. 3, all ramps of the second track row lead from top left to bottom right between adjacent levels and track columns. Analogously, all ramps of the third track row lead from bottom left to top right between adjacent levels and track columns. In FIG. 3, only 8 one-way ramps 14, 16, 20, 22 in total would at least be required to connect the entry point 27 and the exit point 28 with any track level. Seven of those one-way ramps 14, 16, 20, 22 are arranged in the third track row and one first one-way ramp 14 between the fifth and the fourth track level and the first and second track column. If there was enough lateral space for another track column right to the first track column, all 8 one-way ramps 14, 16, 20, 22 could have been arranged in the same track row, so that the second track row would not be necessary altogether. FIG. 3 shows 32 ramps in total, of which 16 ramps are arranged in the second track row and 16 ramps are arranged in the third track row. Therefore, the embodiment of FIG. 3 comprises a redundancy of 24 additional ramps that provide alternative options for paths to the entry point 27 or from the exit point 28. This may reduce the risk of congestions and allow for more traffic, i.e. for more carriages 2 to be operated simultaneously. Moreover, the track arrangement 1 of FIG. 3 could allow for up to three more interaction sites 10 to be served in parallel. For instance, another interaction site could be arranged on the third track level between the fourth and fifth track column, and/or on the first and/or fifth track level between the second and third track column and/or between the fourth and fifth track column.

Figure 4:
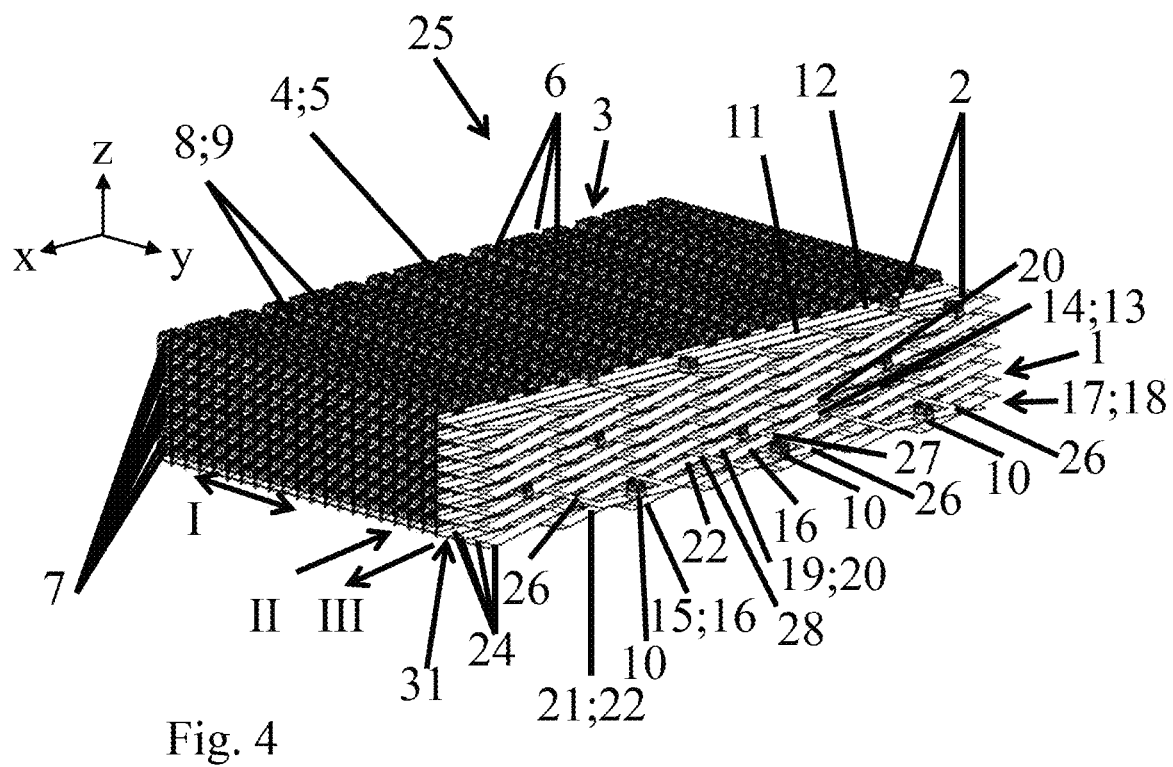
FIG. 4 is a perspective view of an embodiment according to the present disclosure, comprising two unidirectional horizontal tracks on each storage level.

FIGS. 4 to 7 each show a perspective view of an embodiment of an automated storage and retrieval system 25 and a track arrangement 1 according to the present disclosure, comprising two unidirectional horizontal tracks 11, 12 on each storage level 7. FIG. 4 shows an embodiment with three interaction sites each having entry points 27 and exit points on the third track level. The track arrangement 1 of FIG. 4 has altogether 8 levels and 8 track columns with 98 ramps, wherein 49 ramps are arranged in a 7×7 top-left-to-bottom-right configuration in the third track row and 49 ramps are arranged in a complementary 7×7 bottom-left-to-top-right configuration in the fourth track row. The redundancy of ramps could allow for up to four more interaction sites to be served in parallel and/or be used to allow for more traffic. In both embodiments of FIGS. 3 and 4, the connection tracks 31 in aisle direction are unidirectional.

Figure 5:
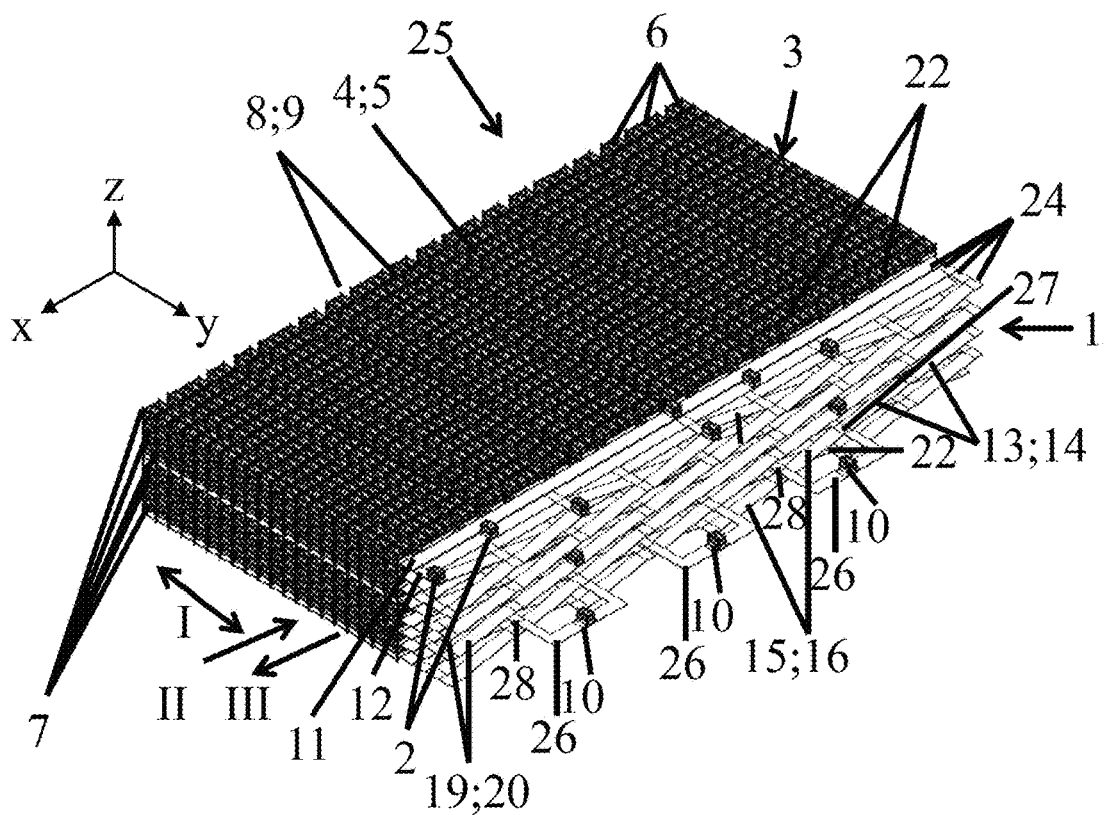
FIG. 5 is a perspective view of an embodiment according to the present disclosure, comprising two unidirectional horizontal tracks on each storage level.

The embodiment shown in FIG. 5 has nine track levels, four track rows, nine track columns, and three interaction sites 10 with entry points 27 and exit points 28 on the third level. The density of ramps is significantly lower than the density of ramps in the embodiments shown in FIGS. 3 and 4. The total number of ramps is 58 in FIG. 5, wherein the same track row comprises four ramps between the same track columns connecting every second pair of levels (1-2, 3-4, 5-6, 7-8) with each other, and wherein the adjacent track row comprises four ramps between the same track columns connecting the complementary pairs of levels (2-3, 4-5, 6-7, 8-9) with each other. The connection tracks 31 in aisle direction are bidirectional in this case. The redundancy in this case would only allow for one more interaction site 10 to be served in parallel.

FIG. 5 shows a specific case of a non-uniform storage level height to deal with. A storage rack arrangement 3 may comprise, for instance due to fire protection regulations or other constraints, one or more storage levels with a height that differs from the height of the other storage levels. In FIG. 5, the storage rack arrangement 3 comprises 8 storage levels 7, i.e. one level less than the nine track levels of the track arrangement 1. The fourth storage level height is larger than the other storage level heights. In order to be able to climb the higher fourth storage level, the fourth and fifth track level of the track arrangement 1 are each half the height of the fourth storage level height. Therefore, the lowest four track levels of the track arrangement 1 correspond to the storage levels 1-4, whereas the topmost four track levels of the track arrangement 1 correspond to the storage levels 5-8. The fifth track level of the track arrangement 1 is an auxiliary track level between the fourth and fifth storage level so that the higher storage level height can be climbed without exceeding a maximum slope angle $\alpha_{max}$. Therefore, the track arrangement 1 comprises six longer one-way ramps extending between second-nearest track columns (2-4, 5-6, 7-8) and between second-nearest track levels (4-6). These longer ramps have a somewhat smaller slope angle than the ordinary ramps and cross the grid without connecting points on the (auxiliary) fifth track level. As the lateral space at the lateral end track columns, i.e. between the first and second track column, and the eighth and ninth track column, respectively, is not sufficient to accommodate the longer ramps, the track arrangement 1 comprises at each lateral end two ordinary ramps with a smaller slope angle connected in a zig-zag configuration by two connecting points on the (auxiliary) fifth track level and implying each a 180-degree turn. The connecting points in the first and ninth track column are the only connecting points on the (auxiliary) fifth track level.

Figure 6:
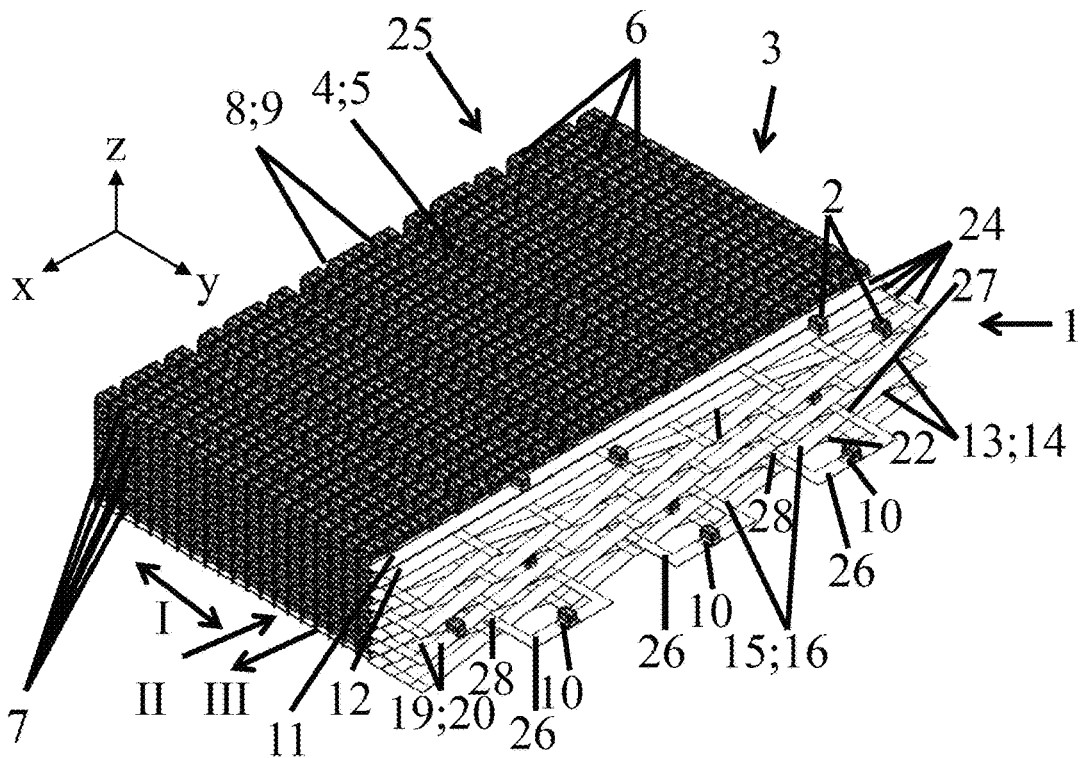
FIG. 6 is a perspective view of an embodiment according to the present disclosure, comprising two unidirectional horizontal tracks on each storage level.

FIG. 6 is an embodiment similar to FIG. 5 without the need for dealing with a non-uniform storage level height. All eight storage heights are the same in FIG. 6 so that the track arrangement 1 only comprises eight corresponding track levels and eight track columns. The ramp density is half of the ramp density of FIG. 4, i.e. 49 ramps to serve three interaction sites 10. The same track row comprises, in an alternating fashion, four or three ramps between the same track columns connecting every second pair of track levels (1-2, 3-4, 5-6, 7-8 or 2-3, 4-5, 6-7) with each other, and wherein the adjacent track row comprises three or four ramps between the same track columns connecting the complementary pairs of track levels (2-3, 4-5, 6-7 or 1-2, 3-4, 5-6, 7-8) with each other. The connection tracks 31 in aisle direction are bidirectional in this case. The redundancy in this case would only allow for one more interaction site 10 to be served in parallel.

In FIGS. 4-7, at any storage level, the first unidirectional horizontal one-way track 11 and the second unidirectional horizontal one-way track 12 enable a carriage 2 to move, at the same storage level 7, from any aisle track 8 to another aisle track 8. In the aisle direction I, the track arrangement 1 extends by the width of four (FIGS. 4 to 6) or three (FIG. 7) tracks and/or connection points 24 away from the front face 32 of the rack arrangement 3. The first horizontal one-way track 11 and the second horizontal one-way track 12 provide short paths between the interaction site 10 and any of the storage sites 5.

The track arrangement 1 comprises a plurality of interaction sites 10. Any of said interaction sites 10 is connected by tracks 11, 12 and/or one-way ramps 14, 16, 20, 22 to any of the storage sites 5. In an alternative embodiment, the track arrangement 1 can comprise a plurality of complementary track arrangement sections, wherein any complementary track arrangement section connects exactly one interaction site 10 by tracks 11, 12 and/or one-way ramps 14, 16, 20, 22 of said complementary track arrangement section to a particular set of storage sites 5 of the rack arrangement 3. The complementary track arrangement sections are arranged so that any storage site 5 is connected to any of the interaction sites 10.

The track arrangement 1 comprises a plurality of first sequences 13 of first one-way ramps 14, a plurality of second sequences 15 of second one-way ramps 16, a plurality of third sequences 19 of third one-way ramps 20, and a plurality of fourth sequences 21 of fourth one-way ramps 22. Thereby, there is a plurality of first paths from any of the storage sites 5 to any of the interaction sites 10, and a plurality of second path from any of the interaction sites 10 to any of the storage sites 5.

Figure 7:
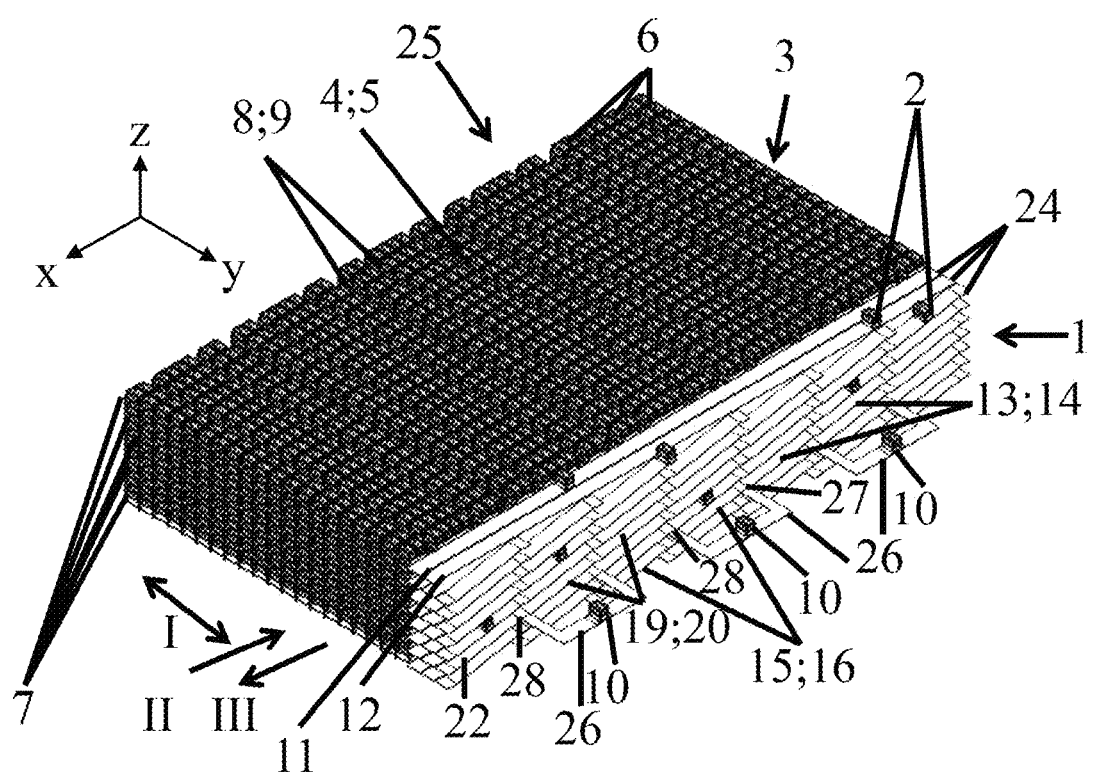
FIG. 7 is a perspective view of an embodiment according to the present disclosure, comprising two unidirectional horizontal tracks on each storage level.

The connection points 24, the entry points 27, and the exit points 28 are arranged on a three-dimensional grid as explained with reference to FIG. 3, wherein the number Y of track rows equals the maximum number of connection points 24 in aisle direction I, therefore Y=4 (FIGS. 4 to 6) or Y=3 (FIG. 7).

In the embodiment of FIG. 7, the track arrangement 1 comprises only three track rows, wherein the first unidirectional horizontal one-way track 11 is arranged in the first track row, the second unidirectional horizontal one-way track 12 is arranged in the second track row and all ramps are arranged in the third track row. This can save construction space in the aisle direction I. Any of the first, second, third, and/or fourth one-way ramps 14, 16, 20, 22 are arranged essentially in parallel to each other in a bottom-left-to-top-right configuration. Without having another track row with the complimentary top-left-to-bottom-right configuration, certain paths will require that the carriages must do two or more 180-degree turns with a horizontal path section in between along the first or second horizontal one-way track 11, 12 to reach a certain track level. If there are several options for a path, the optimal path may be chosen based on the number of needed 180-degree turns, the needed total length of horizontal path sections and/or current traffic situation. Preferably, the driving direction of ramps connecting the same track columns alternates between adjacent track levels. Preferably, the driving direction of ramps connecting the same track levels alternates between adjacent track columns.

Figure 8:
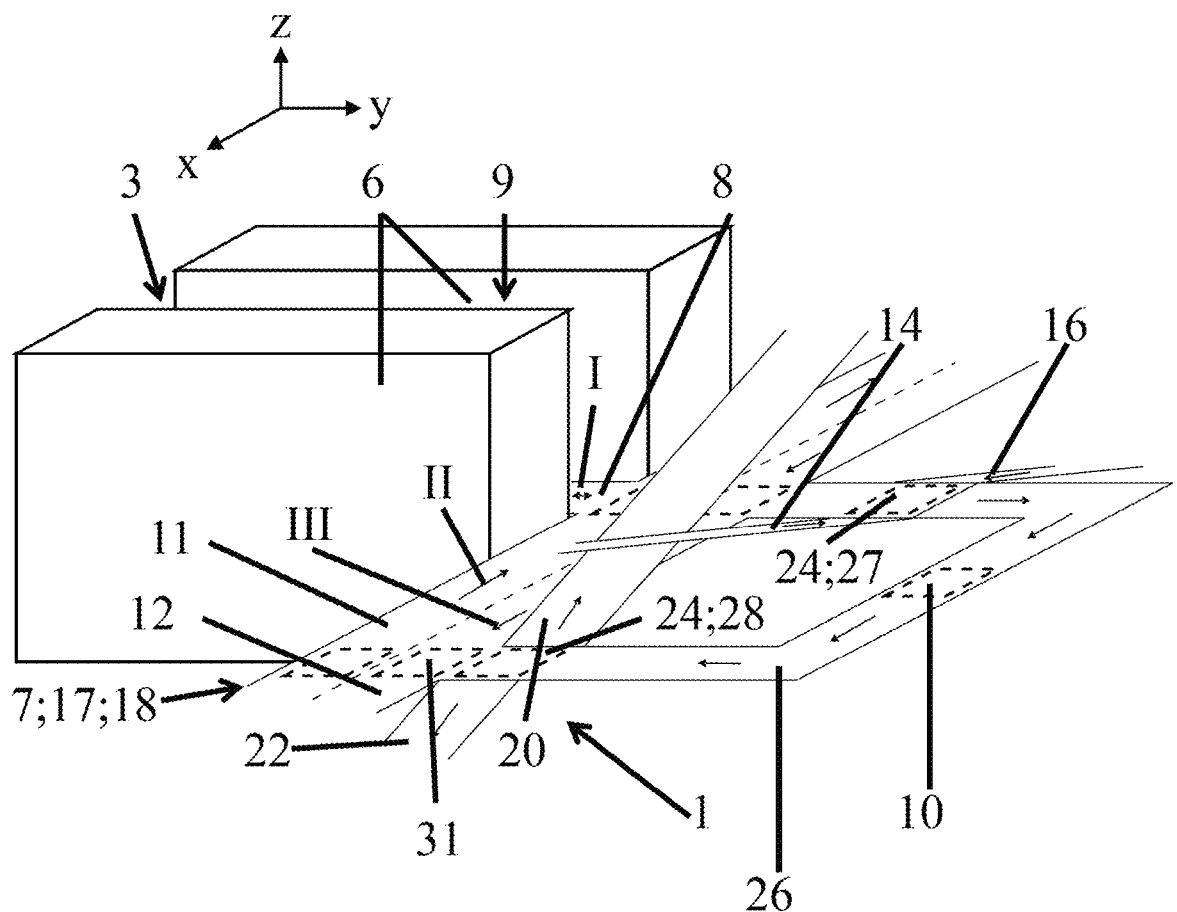
FIG. 8 is a perspective view of a section of a track arrangement according to an embodiment of the present disclosure.

FIG. 8 shows a perspective view of a section of a track arrangement 1 according to an embodiment of the present disclosure. The section of the track arrangement 1 of FIG. 8 is explained with reference to the embodiment of FIGS. 1 and 2, wherein the differences of the embodiments are detailed. Such a section of a track arrangement 1 can be comprised by an embodiment as shown in FIGS. 1 to 6.

In the section of the track arrangement 1 that is shown in FIG. 8, the track arrangement 1 comprises a first one-way ramp 14 and a second one-way ramp 16 each of which leads to an entry point 27 in the same fourth track row, i.e., to a connection point 24 that is arranged on the entry point level 17. The track arrangement 1 comprises a third one-way ramp 20 and a fourth one-way ramp 22 each of which leads away from an exit point 28 in the same third track row, i.e., away from a connection point 24 that is arranged on the exit point level 18. In this embodiment, the entry point level 17 is the track level at which the interaction site 10 is arranged. The third one-way ramp 20 and the fourth one-way ramp 22 are arranged in the third track row, i.e. closer to the first horizontal one-way track 11 in a direction transverse to the aisle direction I than the first one-way ramp 14 and the second one-way ramp 16 in the fourth track row.

In this embodiment, a carriage 2 on a storage level 7 above or below the entry point level 17 can reach the entry point level 17 via the first and second one-way ramps 14, 16. The first one-way ramp 14 leads downwards towards the entry point 27 and the second one-way ramp 16 leads upwards to the entry point 27.

A carriage 2 on the track level at which the interaction site 10 is arranged, can reach from the exit point level 18 a storage level 7 above or below via the third and fourth one-way ramps 20, 22. The third one-way ramp 20 leads upwards away from the exit point 28 and the fourth one-way ramp 22 leads downwards away from the exit point 28.

Figure 9:
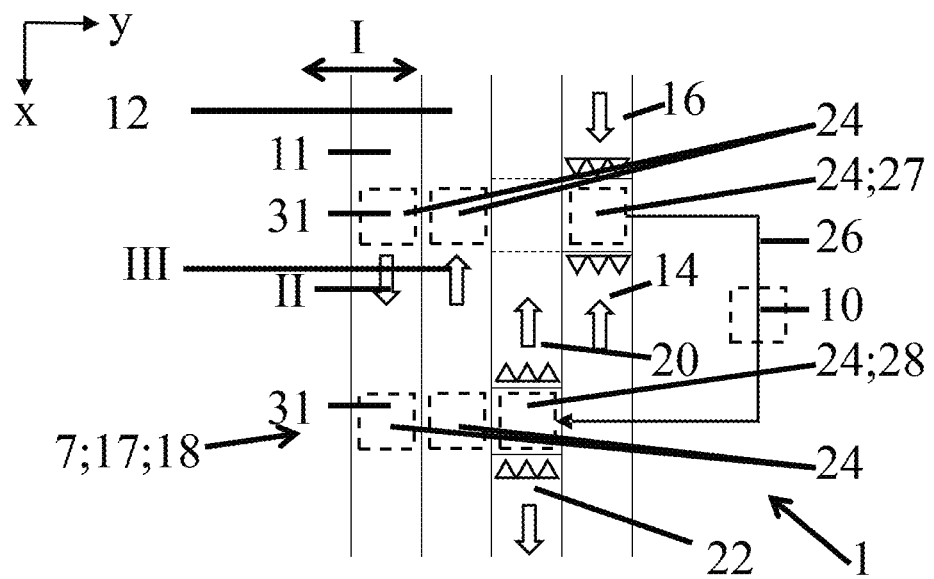
FIG. 9 is a schematic top view showing the track arrangement of FIG. 8.

FIG. 9 shows the track arrangement 1 of FIG. 8 in a schematic top view. The three triangles on the ramps indicate the slope direction by pointing upward with their tips, whereas the hollow arrows indicate the driving direction. In the aisle direction I, four track rows of tracks 11, 12, 14, 16, 20, 22 are arranged in the following order starting from the front face 32 of the storage rack arrangement 3: the first horizontal one-way track 11 in the first track row, the second horizontal one-way track 12 in the second track row, the third and fourth one-way ramp 20, 22 in the third track row and the first and the second one-way ramp 14, 16 in the fourth track row. Said four tracks 11, 12, 14, 16, 20, 22 are connected to each other by connection points 24 defining a connection track 31 extending in the aisle direction I. At each connection point 24, the carriages 2 can efficiently change from one track row to another and between tracks 11, 12, 14, 16, 20, 22. As can be seen in FIGS. 8 and 9, the connection track 31 is preferably aligned with the aisle 9 to reduce the number of directional changes as well as the horizontal path length as much as possible.

Figure 10:
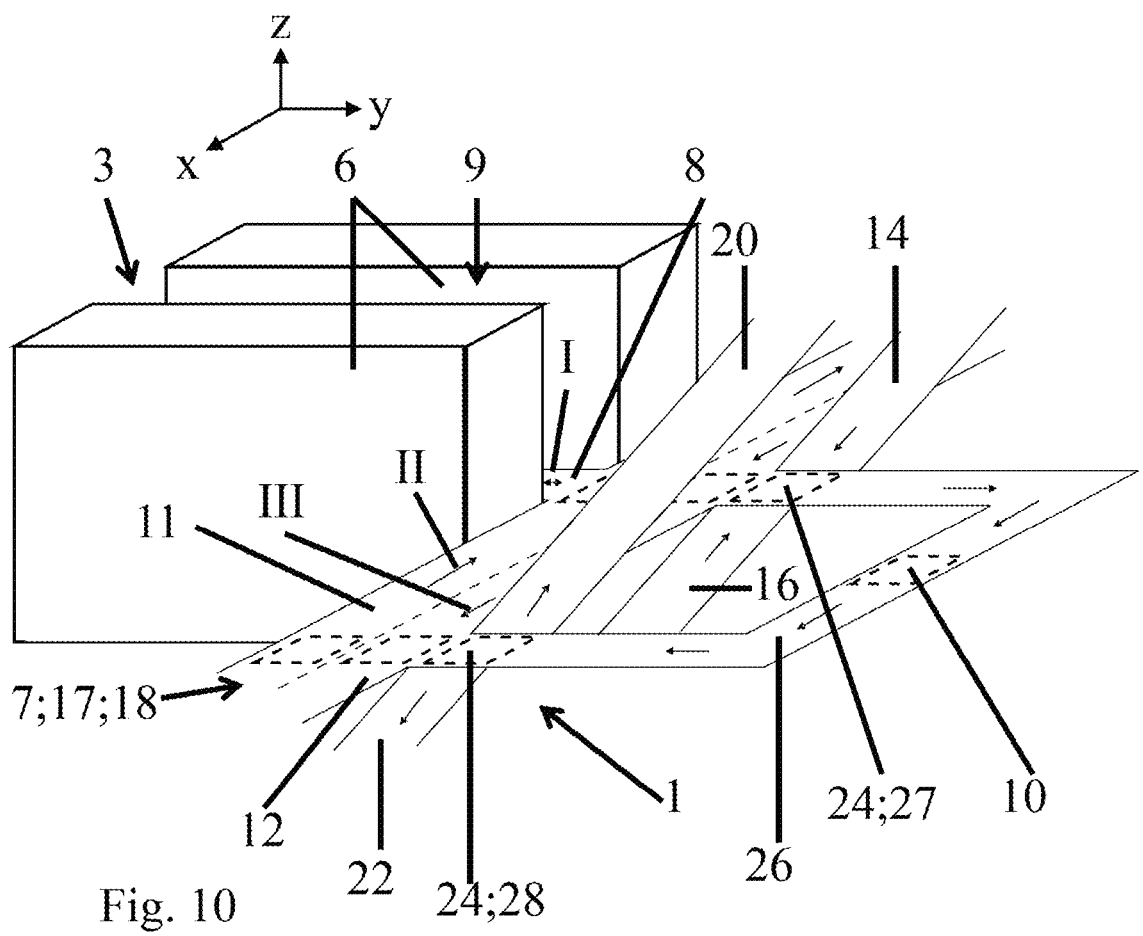
FIG. 10 is a perspective view of a section of a track arrangement according to an embodiment of the present disclosure.

FIG. 10 shows a perspective view of a section of a track arrangement according to an embodiment of the present disclosure. The track arrangement 1 of FIG. 10 is explained with reference to the embodiment of FIGS. 8 and 9, wherein the differences of the embodiments are detailed. Such a section of a track arrangement 1 can be comprised by an embodiment as shown in FIG. 7.

All ramps 14, 16, 20, 22 as well as both the entry point 27 and the exit point 28 are arranged in the same third track row here.

Figure 11:
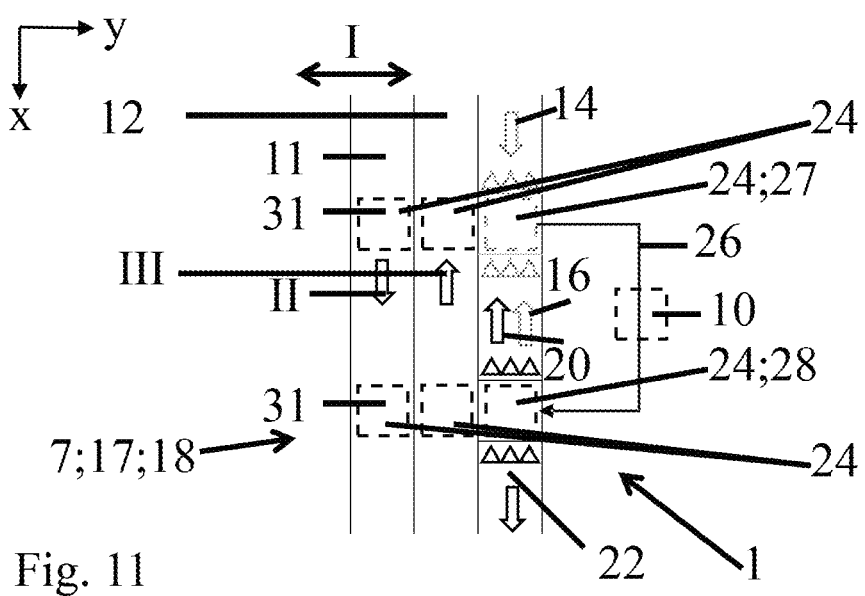
FIG. 11 is a schematic top view showing the embodiment of FIG. 10.

FIG. 11 shows the embodiment of FIG. 10 in a schematic top view. The three triangles on the ramps indicate the slope direction by pointing upward with their tips, whereas the hollow art rack rows indicate the driving direction. In the aisle direction I, three track rows of tracks 11, 12, 14, 16, 20, 22 are arranged in the following order from the storage rack arrangement 3: the first horizontal one-way track 11 in the first track row, the second horizontal one-way track 12 in the second track row, and all ramps 14, 16, 20, 22 in the third track row. The track arrangement 1 of this embodiment saves construction space in the aisle direction I.

Figure 12:
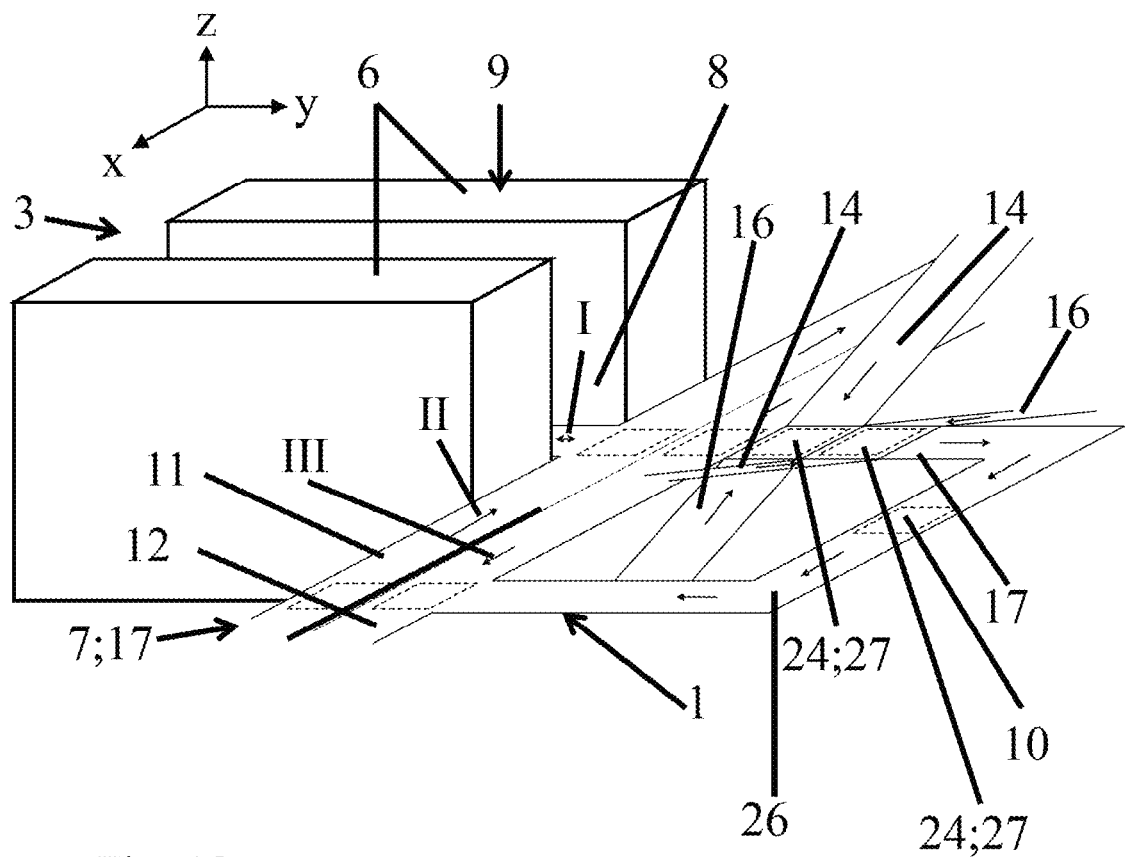
FIG. 12 is a perspective view of a section of a track arrangement according to an embodiment of the present disclosure.

FIG. 12 shows a perspective view of a section of a track arrangement according to an embodiment of the present disclosure. The track arrangement 1 of FIG. 12 is explained with reference to the embodiment of FIGS. 8 and 9, wherein the differences of the embodiments are detailed.

In the section of the track arrangement 1 shown in FIG. 12, the track arrangement 1 comprises a first pair of first and second ramps 14, 16 leading to a first entry point 27 in the third track row and a second pair of first and second ramps 14, 16 leading to a second entry point 27 in the fourth track row. Thereby, the traffic towards the interaction site 10 can be increased, because the carriages have two options for reaching the entry point level 17 from the storage level above via first ramps 14 or from the storage level below via second ramps 14.

A carriage 2 at the interaction site 10 can reach another storage level from an exit point not shown in FIG. 12. The exit point 28, and/or the third and/or fourth one-way ramps 20, 22 can be arranged elsewhere in the track arrangement 1. The third and/or fourth one-way ramp 20, 22 can be arranged analogous to the first and second one-way ramps 14, 16 (see FIGS. 18 and 19).

Figure 13:
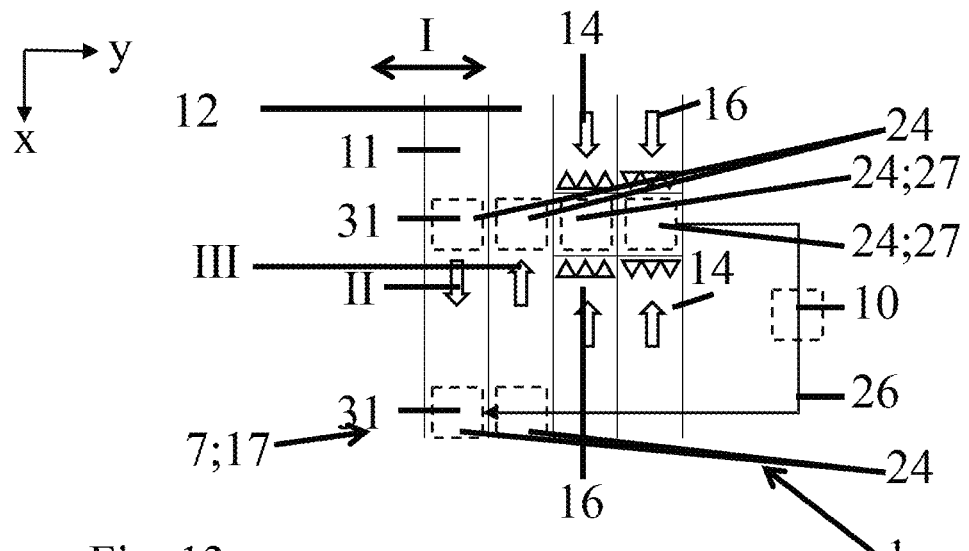
FIG. 13 is a schematic top view showing the embodiment of FIG. 12.

FIG. 13 shows the embodiment of FIG. 12 in a schematic top view. The tracks 11, 12, 14, 16 are arranged in four track rows in the following order from the storage rack arrangement 3: the first horizontal one-way track 11 in the first track row, the second horizontal one-way track 12 in the second track row, the first pair of ramps 14, 16 in the third track row and the second pair of one-way ramps 14, 16 in the fourth track row. The entry points 27 are arranged, on the connection track 31 in the third and fourth track row, respectively.

Figure 14:
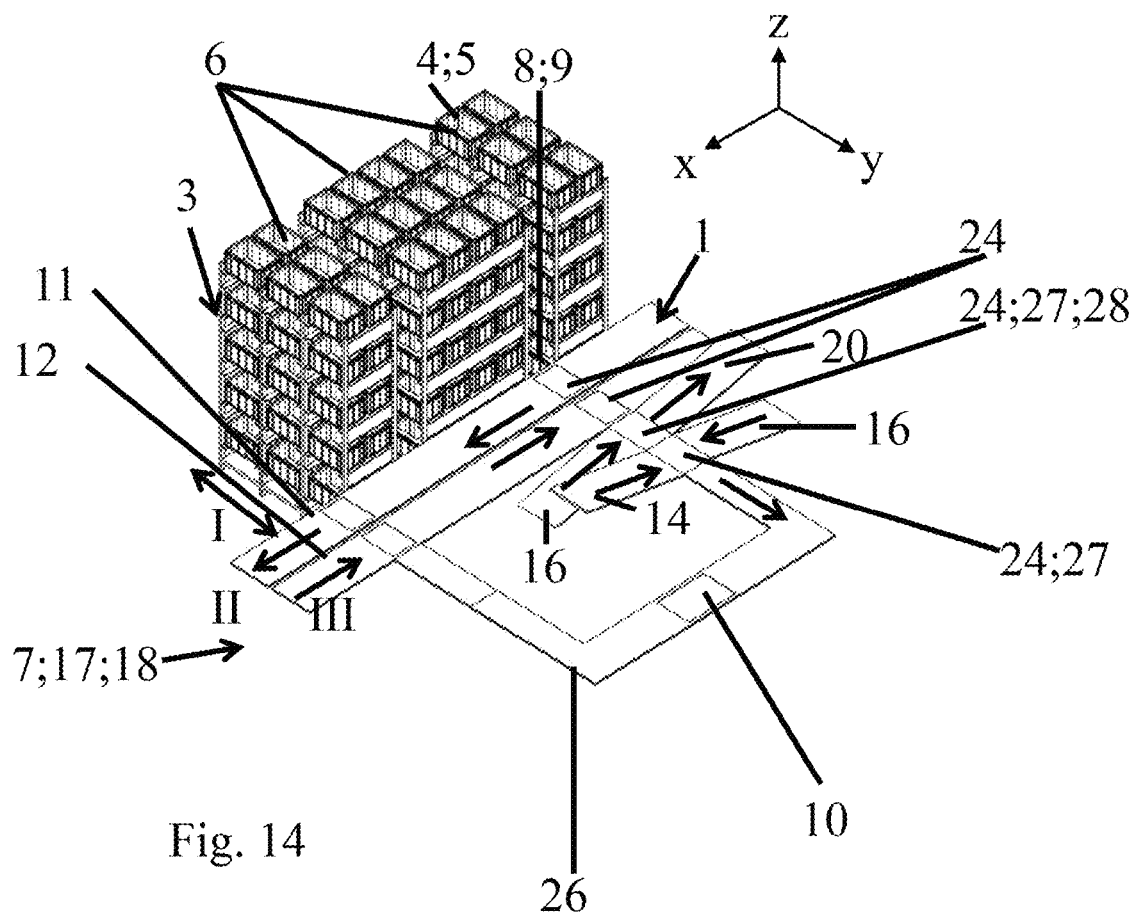
FIG. 14 is a perspective view of a section of a track arrangement according to an embodiment of the present disclosure.

FIG. 14 shows a perspective view of a section of a track arrangement according to an embodiment of the present disclosure. The track arrangement 1 of FIG. 14 is explained with reference to the embodiment of FIGS. 8 and 9, wherein the differences of the embodiments are detailed.

In the section of the track arrangement 1 that is shown in FIG. 14, the track arrangement 1 comprises a first pair of second and third ramps 16, 20 in the third track row and a second pair of first and second ramps 14, 16 in the fourth track row, wherein the connection point 24 in the third track row and the entry point 27 in the fourth track row are arranged on the same connection track 31. The connection point 24 may serve as entry point 27 when coming from the second ramp 16 and as exit point 28 when going to the third ramp 20. As already discussed with reference to FIG. 2, this means that carriages 2 leaving the interaction site 10 to a storage level above must take a short path along the horizontal track 12 in direction III to reach the exit point 28. In order to leave the interaction site 10 to a storage level below via a fourth ramp 22, an exit point 28 and a fourth ramp 22 may be arranged somewhere else (not shown in FIG. 14) to be reached via the horizontal tracks 11, 12. In an alternative embodiment, the first pair of ramps may be a pair of first and fourth ramps 16, 20 in the third track row, so that an exit point 28 and a third ramp 20 may be arranged somewhere else (not shown in FIG. 14) for leaving the interaction site 10 one storage level up.

Figure 15:
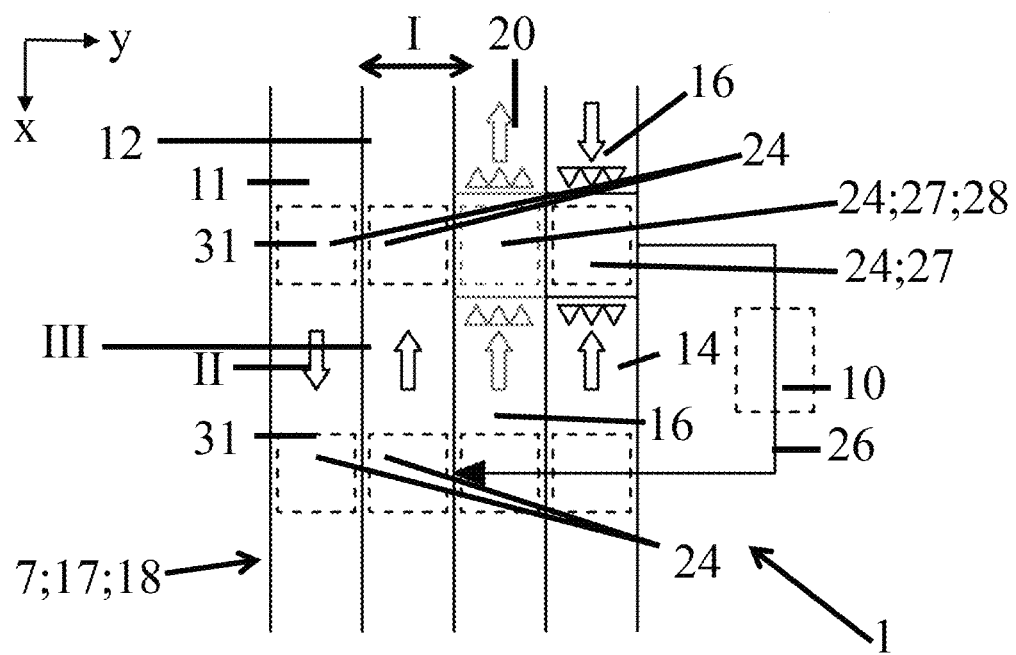
FIG. 15 is a schematic top view showing the embodiment of FIG. 14.

FIG. 15 shows the embodiment of FIG. 14 in a schematic top view. The tracks 11, 12, 14, 16, 20 are arranged in four track rows in the following order from the storage rack arrangement 3: the first horizontal one-way track 11 in the first track row, the second horizontal one-way track 12 in the second track row, the first pair of second and third ramps 16, 20 in the third track row and the second pair of first and second ramps 14, 16 in the fourth track row. The connection point 24 serving as exit and entry point 27, 28 and the entry point 27 are arranged in the third and fourth track row, respectively, along the same connection track 31.

Figure 16:
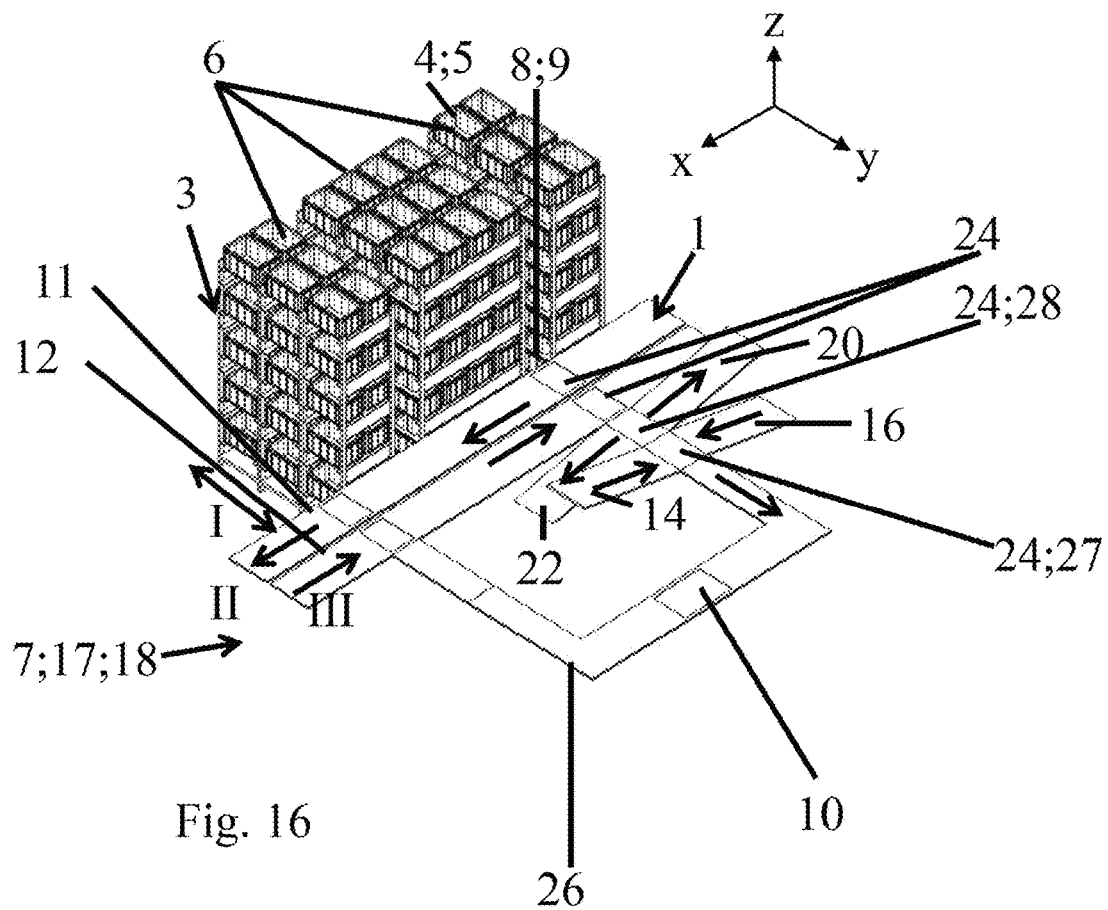
FIG. 16 is a perspective view of a section of a track arrangement according to an embodiment of the present disclosure.

FIG. 16 shows a perspective view of a section of a track arrangement according to an embodiment of the present disclosure. The track arrangement 1 of FIG. 16 is explained with reference to the embodiment of FIGS. 14 and 15, wherein the differences of the embodiments are detailed.

In the section of the track arrangement 1 that is shown in FIG. 16, the track arrangement 1 comprises a first pair of third and fourth ramps 20, 22 in the third track row and a second pair of first and second ramps 14, 16 in the fourth track row, wherein the exit point 28 in the third track row and the entry point 27 in the fourth track row are arranged on the same connection track 31. As already discussed with reference to FIG. 2, this means that carriages 2 leaving the interaction site 10 to a level above or below must take a short path along the horizontal track 12 in direction III to reach the exit point 28.

Figure 17:
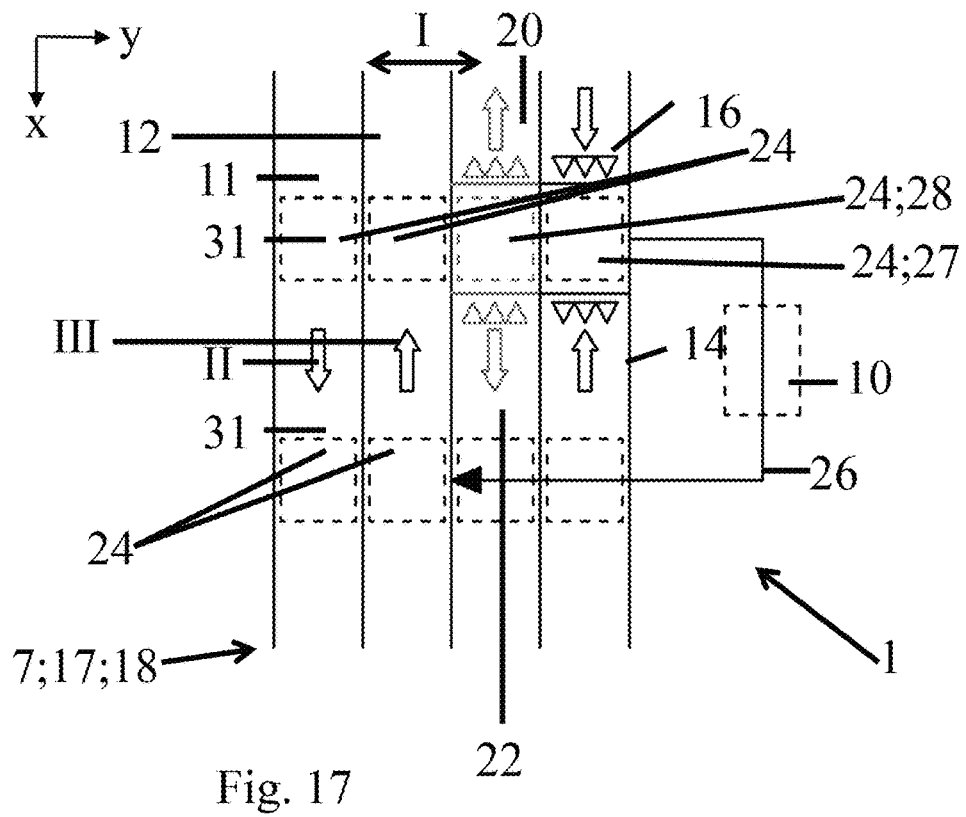
FIG. 17 is a schematic top view showing the embodiment of FIG. 16.

FIG. 17 shows the embodiment of FIG. 16 in a schematic top view. The tracks 11, 12, 14, 16, 20 are arranged in four track rows in the following order from the storage rack arrangement 3: the first horizontal one-way track 11 in the first track row, the second horizontal one-way track 12 in the second track row, the first pair of third and fourth ramps 20, 22 in the third track row and the second pair of first and second ramps 14, 16. The entry points 27 and the exit point 28 are arranged in the third and fourth track row, respectively, along the same connection track 31.

Figure 18:
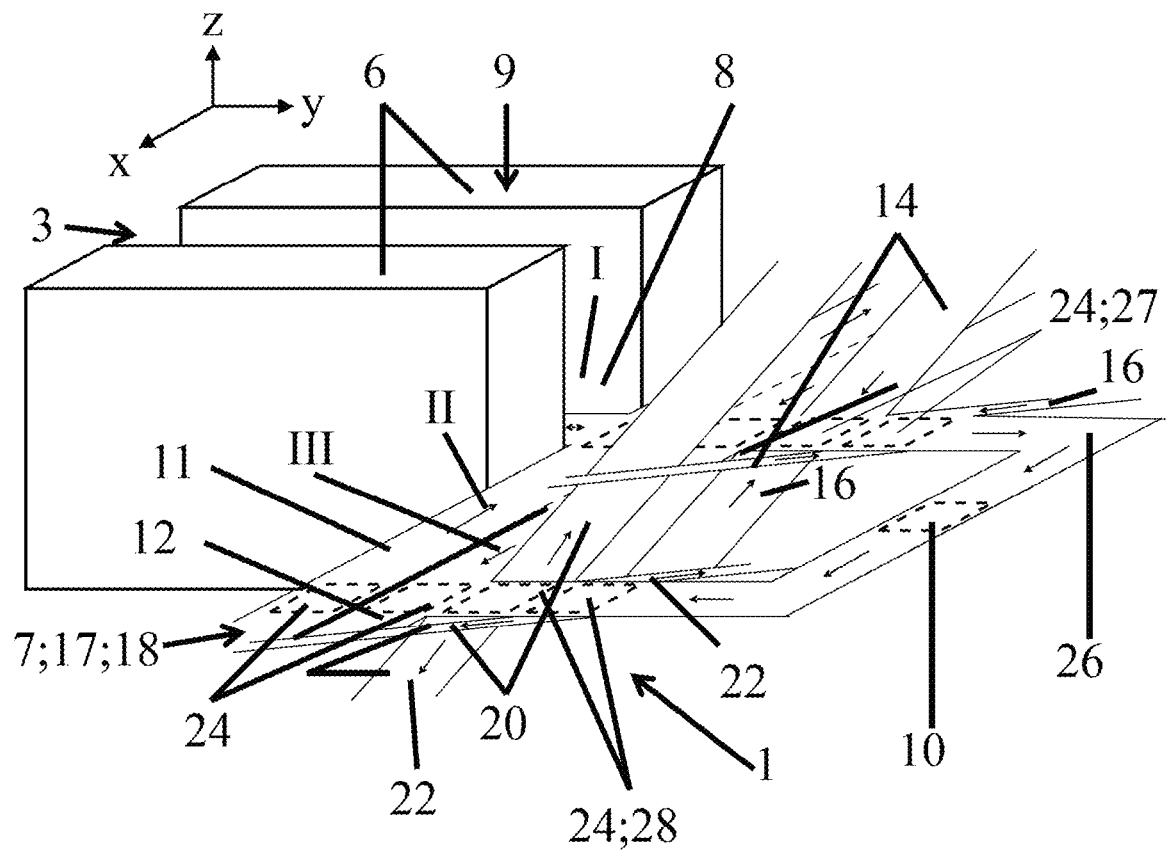
FIG. 18 is a perspective view of a section of a track arrangement according to an embodiment of the present disclosure.

FIG. 18 shows a perspective view of a section of a track arrangement according to an embodiment of the present disclosure. The track arrangement 1 of FIG. 18 is explained with reference to the embodiment of FIGS. 12 and 13, wherein the differences of the embodiments are detailed.

Figure 19:
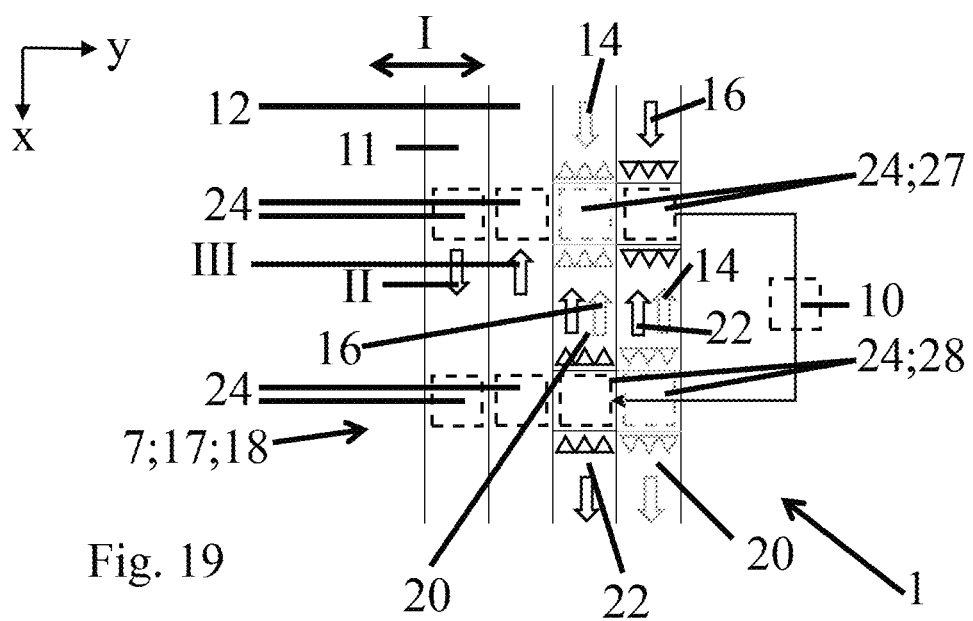
FIG. 19 is a schematic top view showing the embodiment of FIG. 18.

The track arrangement 1 shown in FIGS. 18 and 19 provides double capacity and double ramp density compared to FIG. 8. The track arrangement 1 comprises two entry points in the third and fourth track row, respectively, arranged on the same connection track 31. Furthermore, the track arrangement 1 comprises two exit points 28 in the third and fourth track row, respectively, arranged on another connection track 31 at the adjacent track column. The entry point 27 in the third track row is connected to first and second tracks 14, 16 in a bottom-left-to-top-right configuration, whereas the entry point 27 in the fourth track row is connected to first and second tracks 14, 16 in a complementary top-left-to-bottom-right configuration. Analogously, the exit point 28 in the third track row is connected to third and fourth tracks 20, 22 in a bottom-left-to-top-right configuration, whereas the exit point 28 in the fourth track row is connected to third and fourth tracks 14, 16 in a complementary top-left-to-bottom-right configuration.

Figure 20:
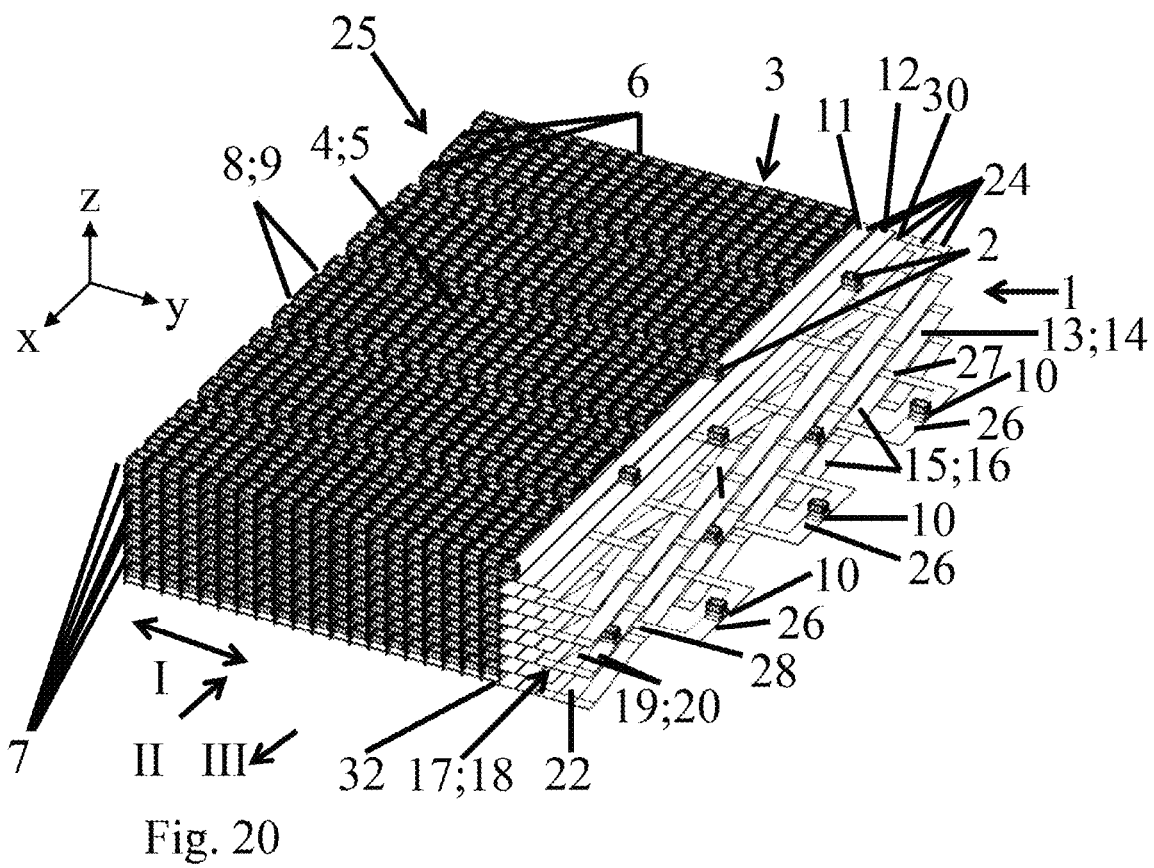
FIG. 20 is a perspective view of an embodiment according to the present disclosure, comprising three horizontal tracks on each storage level.
Figure 21:
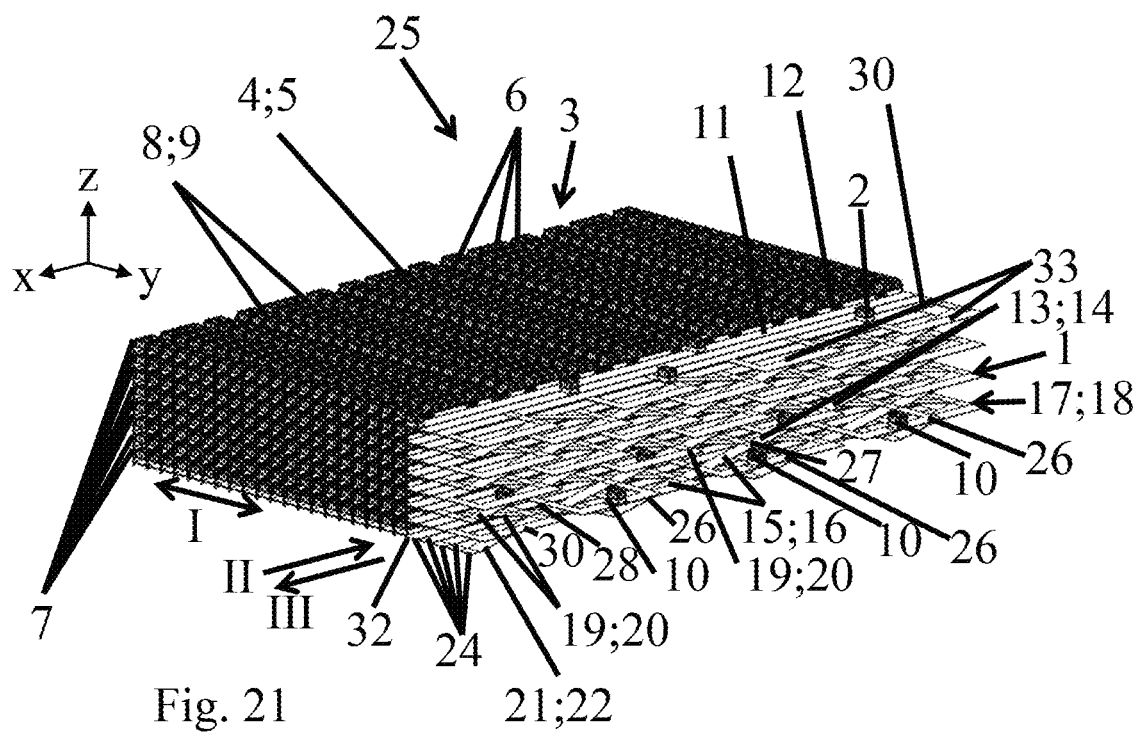
FIG. 21 is a perspective view of the embodiment according to the present disclosure, comprising three horizontal tracks on each storage level.

FIGS. 20 and 21 each shows a perspective view of an embodiment of an automated storage and retrieval system 25 and a track arrangement 1 according to the present disclosure, comprising three horizontal tracks 11, 12, 30 on each storage level 7. The automated storage and retrieval system 25 is described with reference to the embodiment which is shown in FIG. 3, wherein the differences are detailed.

At any storage level 7, the track arrangement 1 comprises in a first track row a first horizontal one-way track 11 connectable to all aisle tracks 8 on each storage level 7 in a first driving direction II transverse to the aisle direction I. Furthermore, the track arrangement 1 comprises in a second track row a second horizontal one-way track 12 connectable to all aisle tracks 8 on each storage level 7 in a second driving direction III opposite to the first direction II. An additional unidirectional or bidirectional horizontal track 30 in the third track row may be foreseen to be connectable to all aisle tracks 8 on each storage level 7. The horizontal tracks 11, 12, 30 enable a carriage 2 to move, at the same storage level 7, from any aisle track 8 to another aisle track 8. The horizontal tracks 11, 12, 30 extend transversely to the aisle direction I and parallel to each other. The one-way ramps 14, 16, 20, 22 are arranged in the fourth and fifth track row. In the aisle direction I, the track arrangement 1 extends by the width of five track widths and/or widths of a connection points 24 away from the front face 32 of the rack arrangement 3.

The number Z of track levels equals the number k of storage levels Z=k=8. The number Y of track rows quals the maximum number of connection points 24 in aisle direction I, therefore, in this embodiment Y=5. The number of track columns X is here the same as the number of track levels, i.e. X=8.

Similar to FIG. 6, the track arrangement of FIG. 20 comprises 49 ramps 14, 16, 20, 22 with 24 ramps in the top-left-to-bottom-right configuration in the fourth track row and 25 ramps in the complementary bottom-left-to-top-right configuration in the fifth track row for serving three interaction sites 10 on the third level.

In FIG. 21, the track arrangement 1 comprises a plurality of holding tracks 33 in an additional sixth track row. A holding track 33 is a section of the track arrangement 1 that can be used to hold a carriage 2 idle and/or to park a carriage, preferably temporarily. This can be useful for fire protection. The holding track 33 can be a one-way track or a bidirectional track. The holding track 33 is preferably horizontal. Preferably, a holding track 33 and a horizontal track 11, 12, 30 define a closed track loop as shown in FIG. 21. The holding tracks 33 may also serve as a bypass for allowing an additional path to the ramps 14, 16, 20, 22. The "normal" entry/exit on each storage level to/from the ramps in the fourth track row is from/to the horizontal track 30 in the third track row. The holding tracks 33 provide an additional "backward" entry/exit on each storage level to/from the ramps in the fifth track row from/to the holding tracks 33 in the third track row. Therefore, the risk of congestions may be reduced, because the carriages 2 have further options for entering/exiting the ramps 14, 16, 20, 22 on each storage level.

Figure 22:
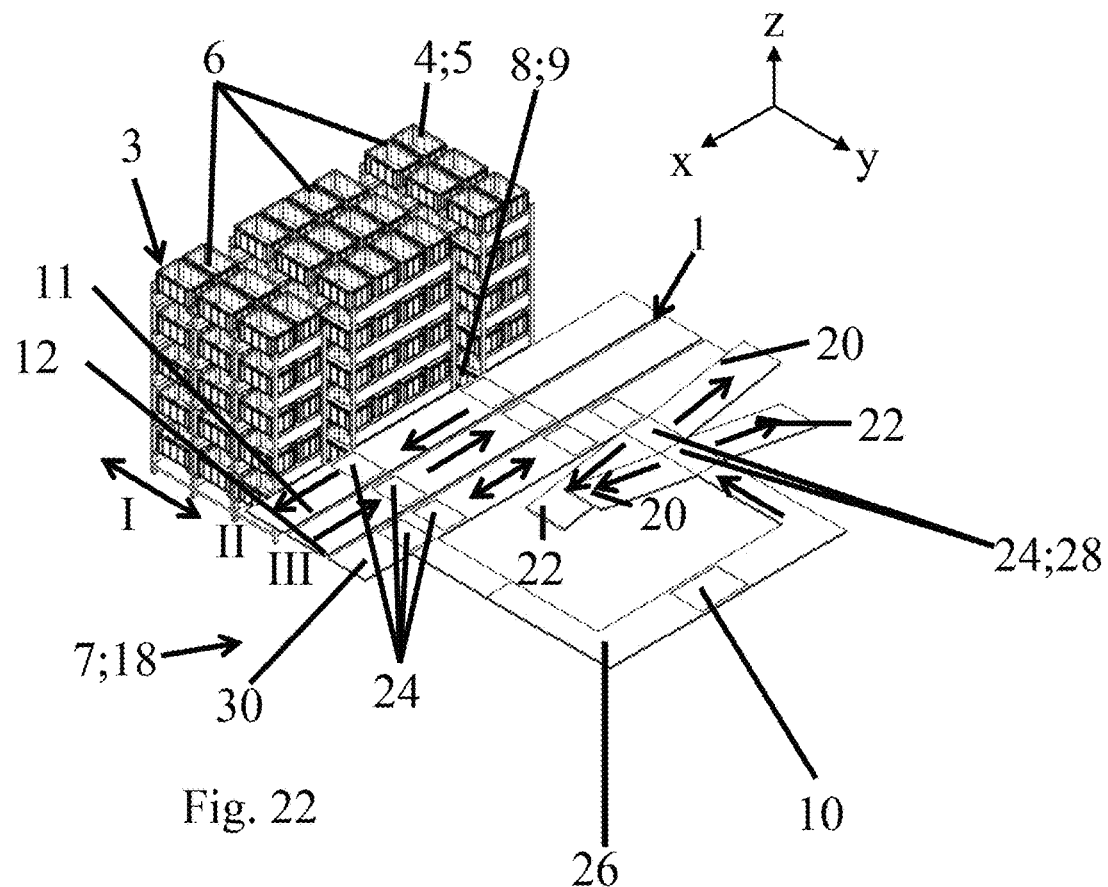
FIG. 22 is a perspective view of a section of a track arrangement according to an embodiment of the present disclosure.

FIG. 22 shows a perspective view of a section of a track arrangement according to an embodiment of the present disclosure. The track arrangement 1 of FIG. 22 is explained with reference to the embodiment of FIGS. 12 and 13, wherein the differences of the embodiments are detailed.

Figure 23:
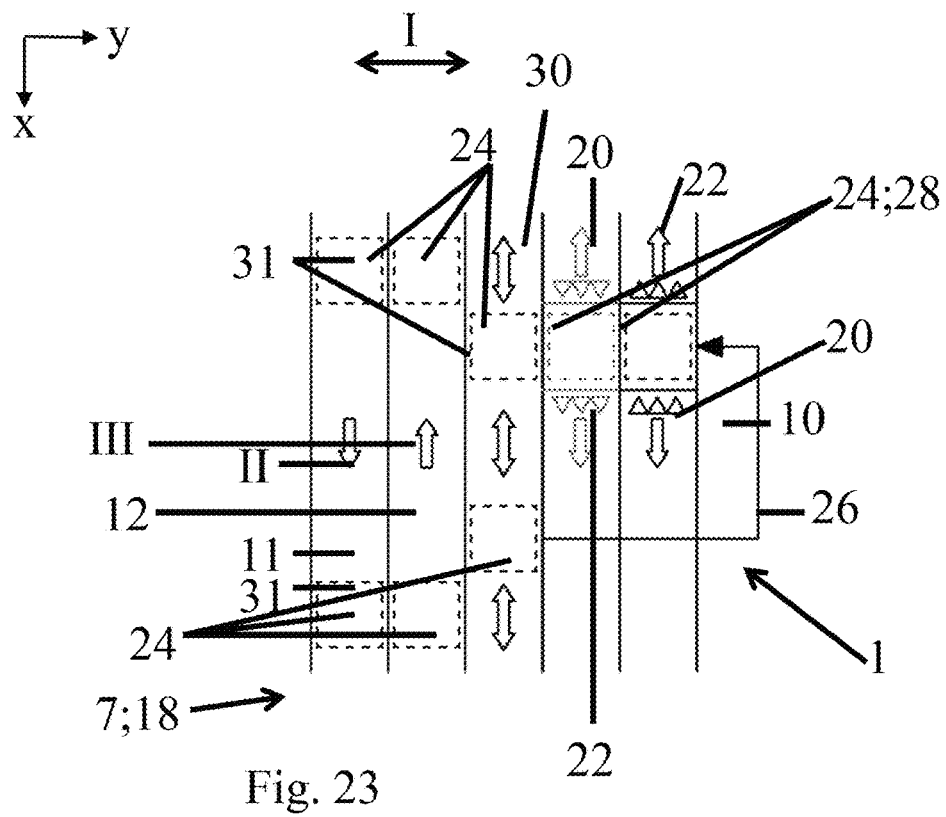
FIG. 23 is a schematic top view showing the embodiment of FIG. 22.

In the section of the track arrangement 1 that is shown in FIGS. 22 and 23, the track arrangement 1 comprises a first horizontal track 11 in the first track row, a second horizontal track 12 in the second track row, a bidirectional horizontal track 30 in the third track row, a first pair of third and fourth ramps 20, 22 in the fourth track row and a second pair of third and fourth ramps 20, 22 in the fifth track row.

A carriage 2 on the interaction site level 7 can reach from the exit point 28 an another storage level 7 via a third and/or fourth one-way ramps 20, 22. Thereby, a carriage 2 can, preferably depending on the occupancy of the third one-way ramps 20 and the fourth one-way ramps 22, chose between at least two different paths away from the interaction site 10.

In this embodiment, a carriage 2 on a storage level 7 above or below the interaction site 10 can reach the entry point 27 via a first one-way ramp 14 or a second one-way ramp 16 that is not shown in the section of the track arrangement 1 of FIG. 22. The entry point 27, and/or the first and/or second one-way ramp 14, 16 can be arranged elsewhere in the track arrangement 1. The first and/or second one-way ramp 14, 16 can be arranged analogous to the third and fourth one-way ramps 20, 22 as shown in FIG. 22.

As shown in FIGS. 22 and 23, the aisle spacing of the storage rack arrangement 3 may not exactly correspond to the track column spacing of the track arrangement 1, which is limited by the maximum slope angle $\alpha_{max}$ the carriages 2 can safely climb and descend. The horizontal track 30 may then serve as a bidirectional adapter track. This is particularly useful if the difference between aisle spacing and track column spacing is a fraction of a track width. The horizontal bidirectional adapter track 30 may alternatively be arranged in the first track row, so that the track 30 may be the only track that must be customised to the storage rack arrangement 3, whereas the other components of the track arrangement 1 may be standard parts.

Figure 24:
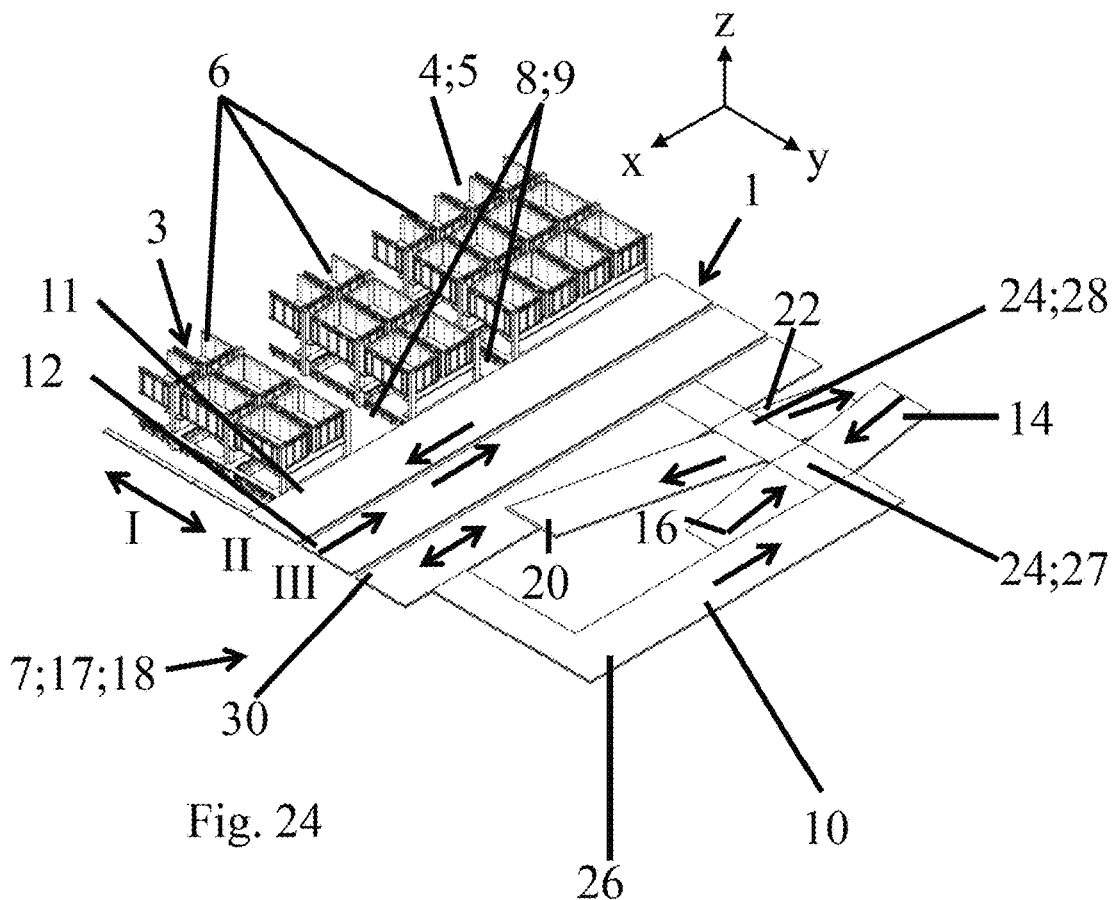
FIG. 24 is a perspective view of a section of a track arrangement according to an embodiment of the present disclosure.

FIG. 24 shows a perspective view of a section of a track arrangement according to an embodiment of the present disclosure. The track arrangement 1 of FIG. 24 is explained with reference to the embodiment of FIGS. 22 and 23, wherein the differences of the embodiments are detailed.

Figure 25:
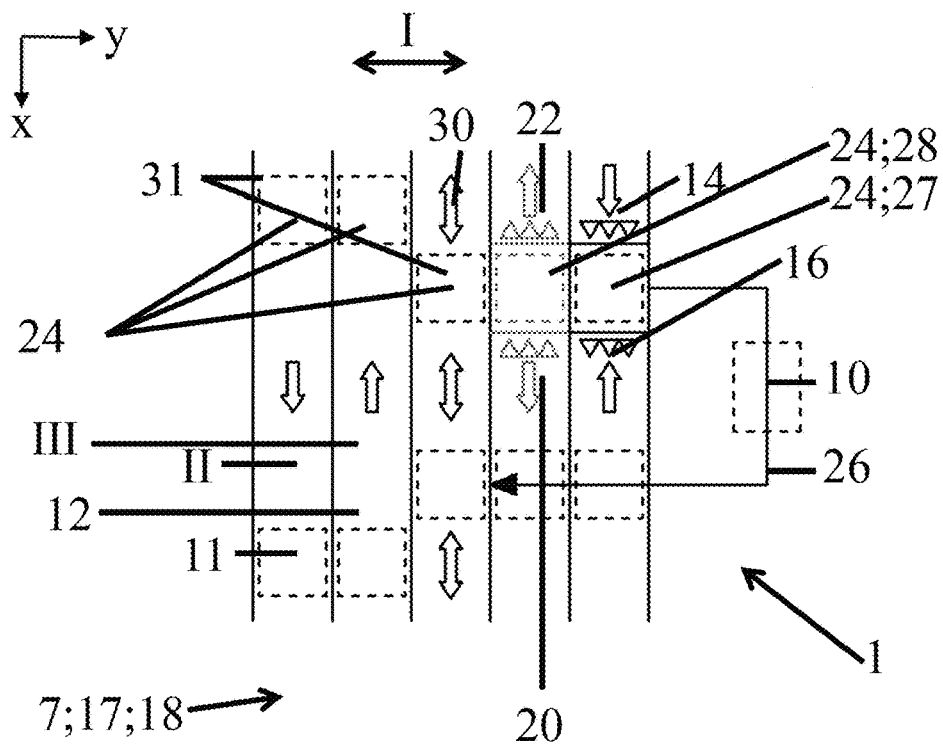
FIG. 25 is a schematic top view showing the embodiment of FIG. 24.

In the section of the track arrangement 1 that is shown in FIG. 24, the track arrangement 1 comprises a first horizontal track 11 in the first track row, a second horizontal track 12 in the second track row, a bidirectional horizontal track 30 in the third track row, a first pair of third and fourth ramps 20, 22 in the fourth track row and a second pair of first and second ramps 14, 16 in the fifth track row. FIG. 25 shows the embodiment of FIG. 24 in a schematic top view. In the embodiment of FIGS. 24 and 25, the horizontal tracks 11, 12, 30 are arranged as explained with reference to FIGS. 22 and 23, and the one-way ramps 14, 16, 20, 22 are arranged as explained with reference to FIGS. 16 and 17.

Figure 26:
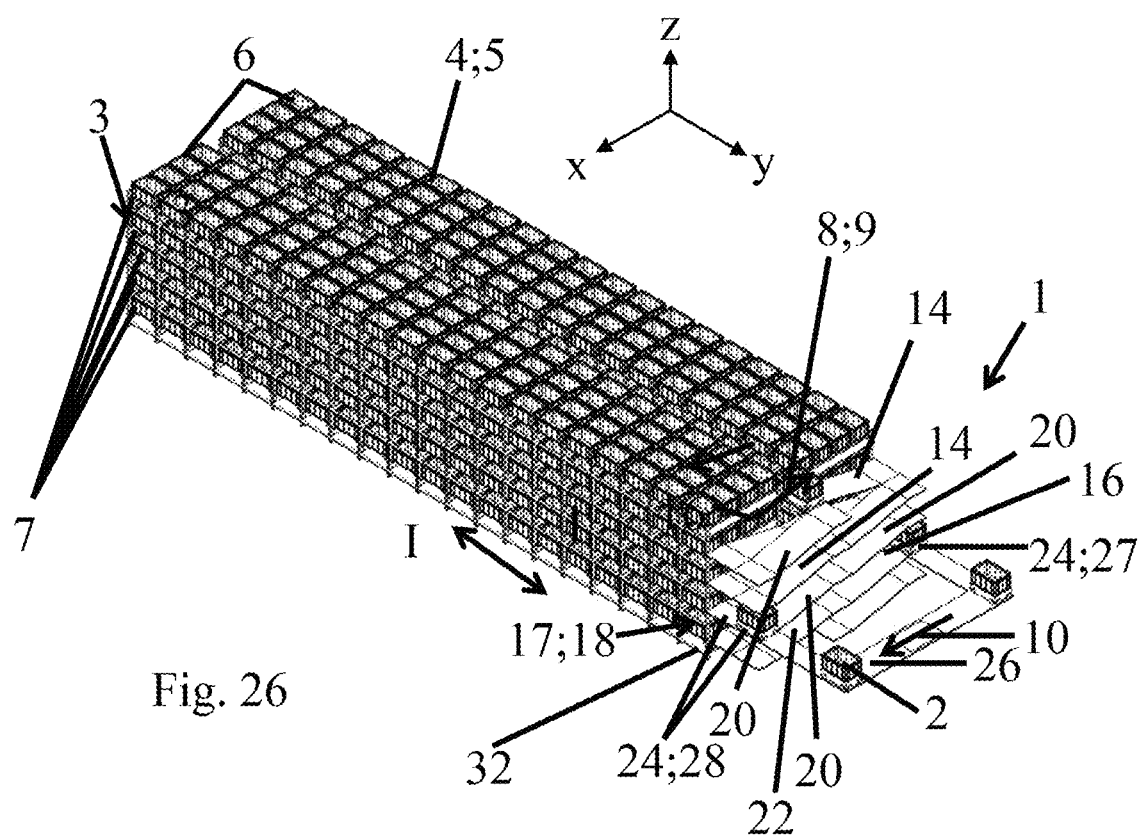
FIG. 26 is a perspective view of an embodiment according to the present disclosure.

FIG. 26 shows a perspective view of an embodiment of an automated storage and retrieval system 25 and a track arrangement 1 according to the present disclosure. The automated storage and retrieval system 25 is described with reference to the embodiment which is shown in FIGS. 1 and 2, wherein the differences are detailed.

The track arrangement 1 as shown in FIG. 26 has nine track levels, three track columns and two track rows to serve one interaction site 10 at the second track level via interaction track 26. The track arrangement 1 is particularly useful for narrow storage rack arrangements 3 with limited lateral space. The storage rack arrangement 3 has only 5 storage levels, but the track arrangement 1 comprises 4 additional auxiliary intermediate track levels between the track levels 1-2, 3-4, 5-6 and 7-8. The track arrangement 1 thus comprises 16 relatively short one-way ramps 14, 16, 20, 22 that each climb only half a storage level to keep the slope angle below the maximum slope angle $\alpha_{max}$, i.e. the track level distance of the track arrangement 1 is here half the storage level height. Five first ramps 14 connect track levels 8-3 downward, three second ramps 16 connect track levels 1-3 upward, five third ramps 20 connect track levels 3-8 upward, and three fourth ramps 22 connect track levels 3-1 downward. The path along a sequence of ramps 14, 16, 20, 22 may include a zig-zag sequence with one or more 180-degree turns at the lateral ends, i.e. at the first and third column. A central connection track 31 at the second track column leads into central aisle tracks 8. The first and third track column are auxiliary track columns with connection points 24 at the auxiliary intermediate track levels, where the carriages 2 can make a 180-degree turn to climb or descend a track level upward or downward. In this embodiment, horizontal tracks 11, 12 with a driving direction transverse to the aisle direction I can be dispensed with, because the storage rack arrangement has only one aisle 9. At any storage level 7, the aisle tracks 8 are connected by the one-way ramps 14, 16, 20, 22 to the interaction track 26. In the aisle direction I, the track arrangement 1 extends by the width of two connection points 24 away from the front face 32 of the rack arrangement 3.

Figure 27:
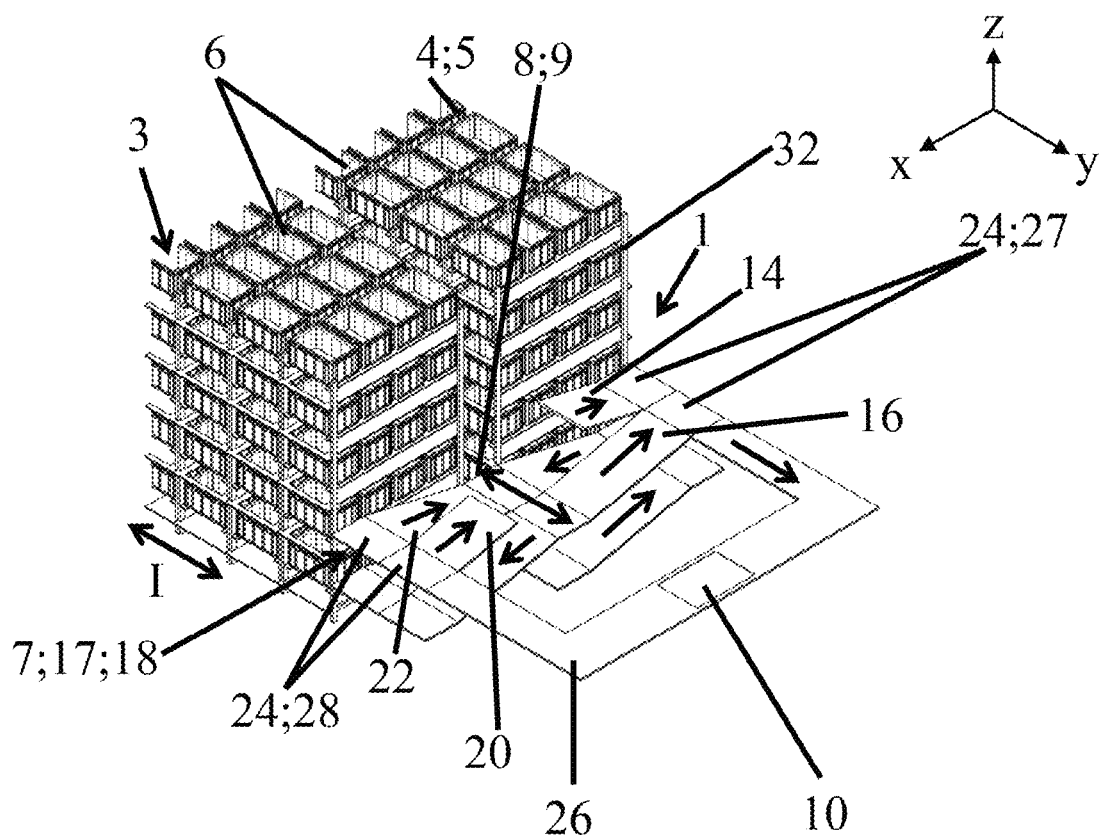
FIG. 27 is a perspective view of a section of the track arrangement of FIG. 26.
Figure 28:
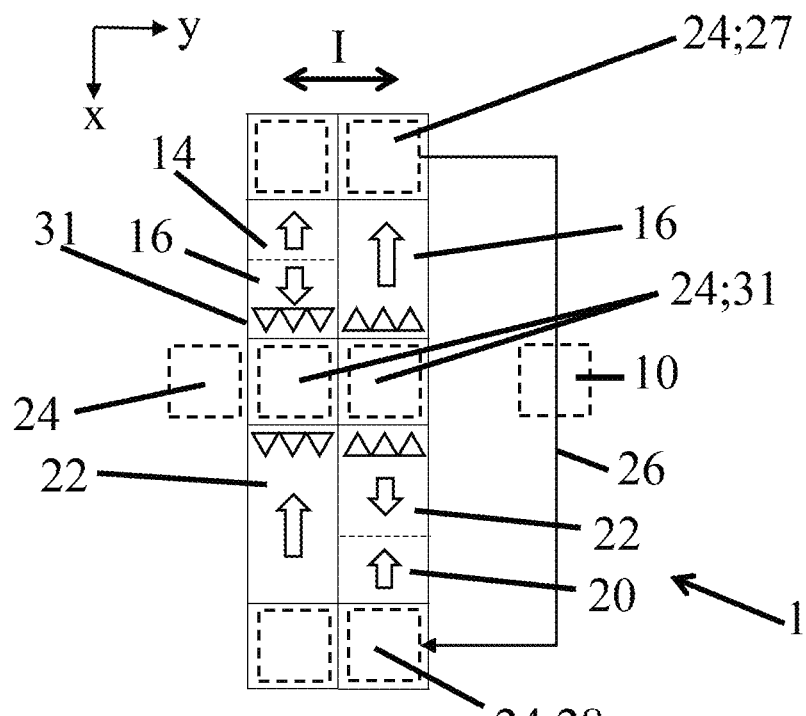
FIG. 28 is a schematic top view showing the embodiment of FIG. 27.

FIG. 27 shows a perspective view of a section of the track arrangement 1 as shown in FIG. 26.

In the section of the track arrangement 1 that is shown in FIG. 27, the track arrangement 1 comprises a first one-way ramp 14 and a second one-way ramp 16 each of which leads to an entry point 27, i.e., to a connection point 24 that is arranged on the entry point level 17. The track arrangement 1 comprises a third one-way ramp 20 and a fourth one-way ramp 22 each of which leads away from an exit point 28, i.e., to a connection point 24 that is arranged on the exit point level 18. In this embodiment, both the entry point level 17 and the exit point level 18 are located at the fourth track level, i.e. the auxiliary intermediate track level between the second and third storage level.

Figures 29A, 29B:
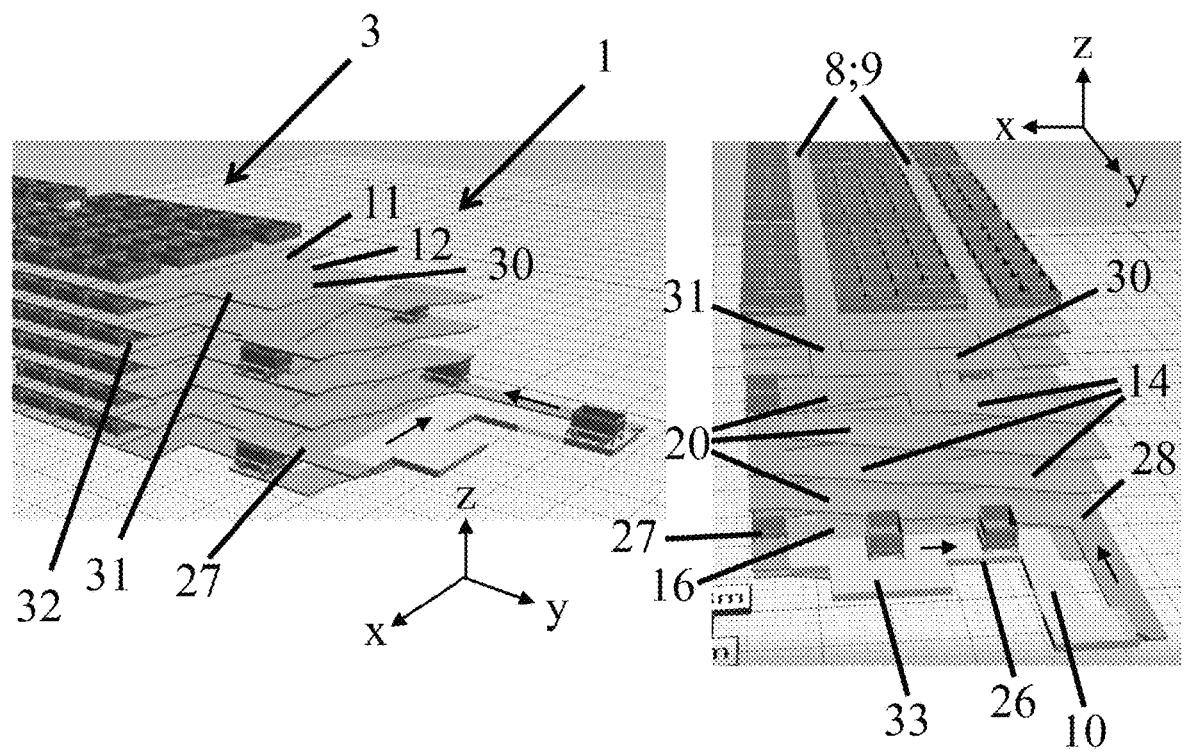
FIG. 29*a* is a perspective view of an automated storage and retrieval system according to an embodiment of the present disclosure.
FIG. 29*b* is another perspective view of the automated storage and retrieval system according to an embodiment of the present disclosure.

FIG. 29a,b show, from different perspectives, another embodiment of a narrow storage rack arrangement 3 with a track arrangement 1 installed at its front face 32. In contrast to FIG. 26, the storage rack arrangement 3 does not comprise only one single central aisle 9, but two parallel aisles 9. The ramps 14, 16, 20, 22 of the track arrangement 1 have the same configuration as in FIG. 26. However, in order to connect the two aisle tracks 8 on each storage level 7, one-way horizontal tracks 11, 12 and a bidirectional horizontal track 30 are arranged at track rows 1-3 at each storage level 7 to connect connection tracks 31 to the aisle tracks 8. The ramps 14, 16, 20, 22 are arranged in the fourth and fifth track row. The interaction track 26 has a different shape and comprises a holding track 33 in form of a park lane. The holding track 33 allows switching the order of carriages 2 in a queue of carriages 2 on the interaction track 26 before being processed at the interaction site 10.

Figure 30:
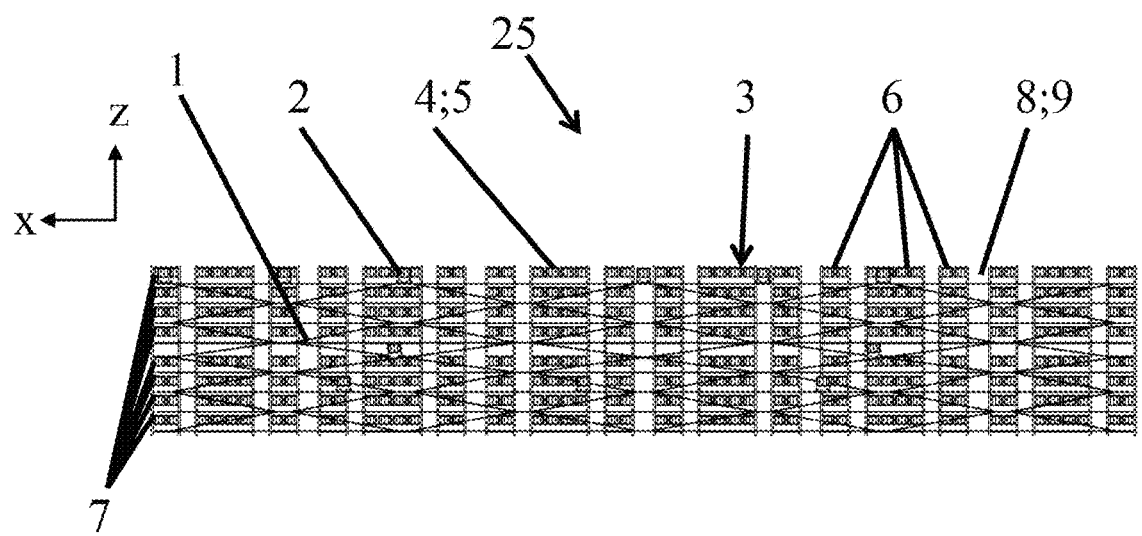
FIG. 30 is a front view of an automated storage and retrieval system according to an embodiment of the present disclosure.
Figure 31:
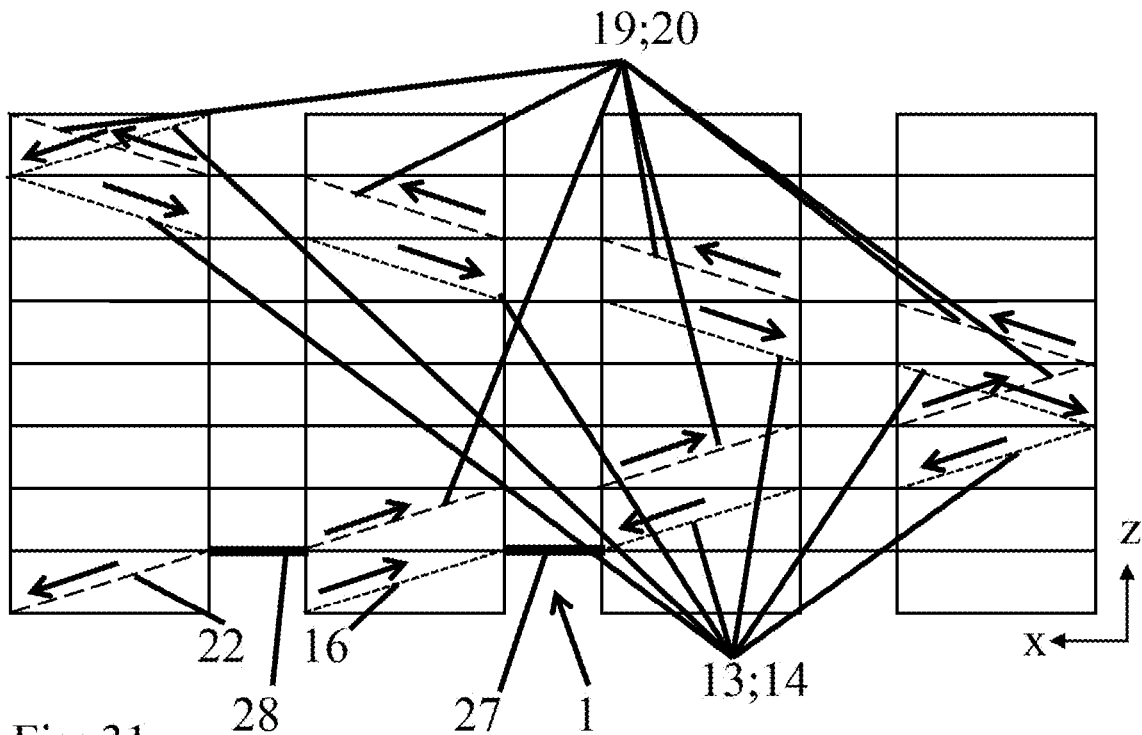
FIG. 31 is a schematic front view of a track arrangement according to an embodiment of the present disclosure.
Figure 32:
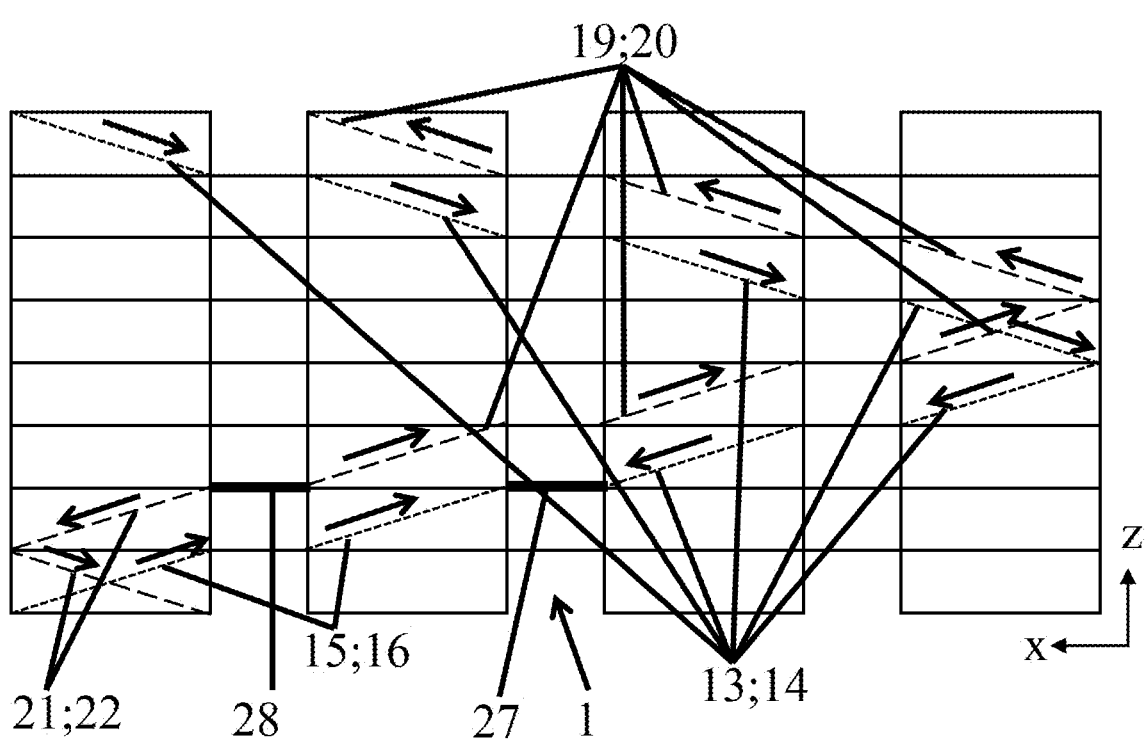
FIG. 32 is a schematic front view of a track arrangement according to an embodiment of the present disclosure.
Figure 33:
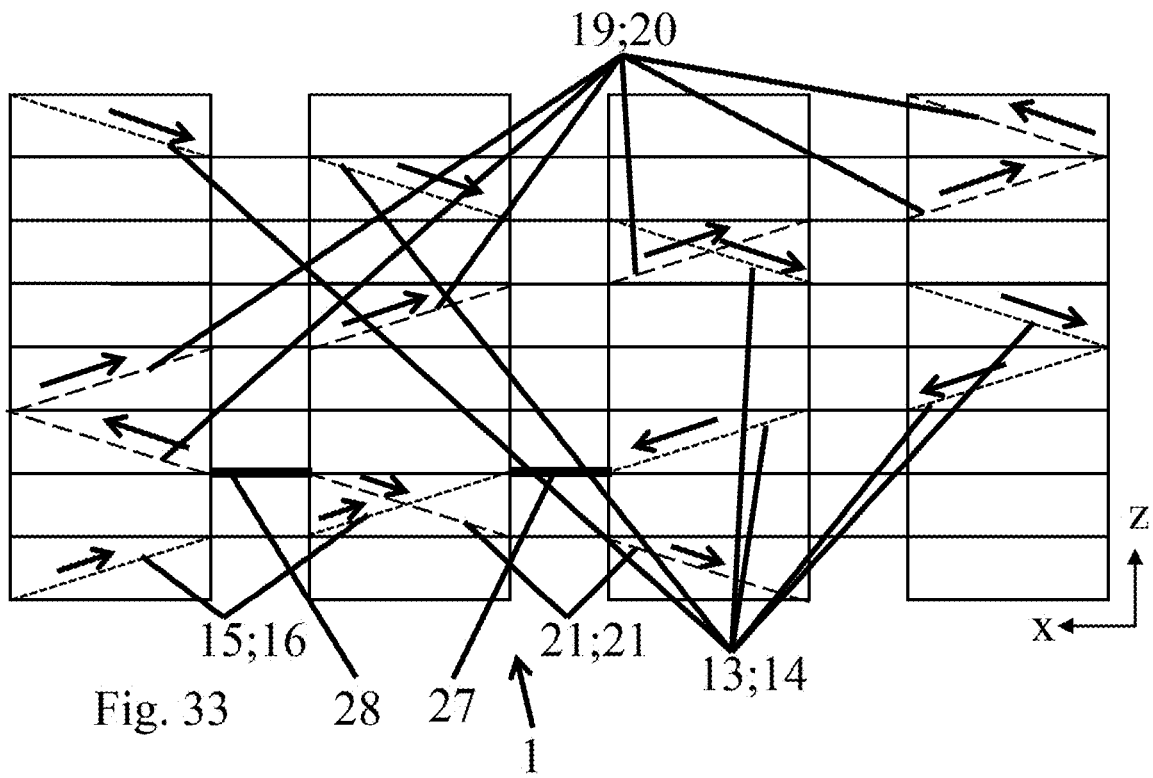
FIG. 33 is a schematic front view of a track arrangement according to an embodiment of the present disclosure.
Figure 34:
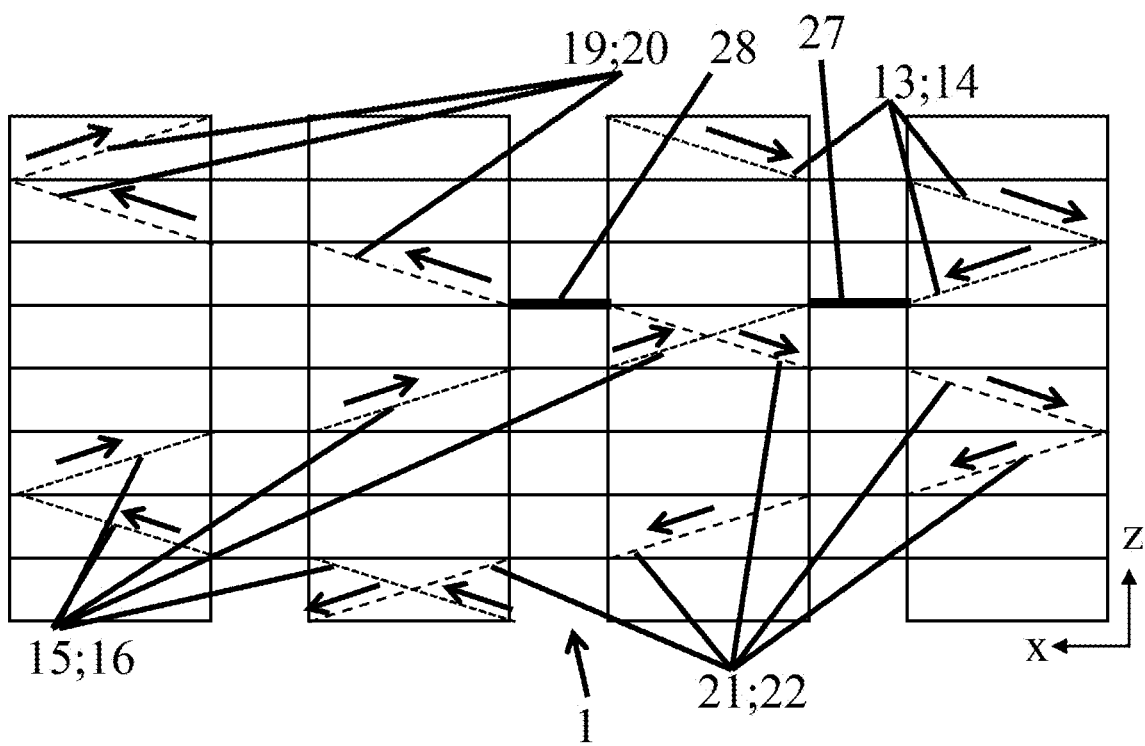
FIG. 34 is a schematic front view of a track arrangement according to an embodiment of the present disclosure.
Figure 35A:
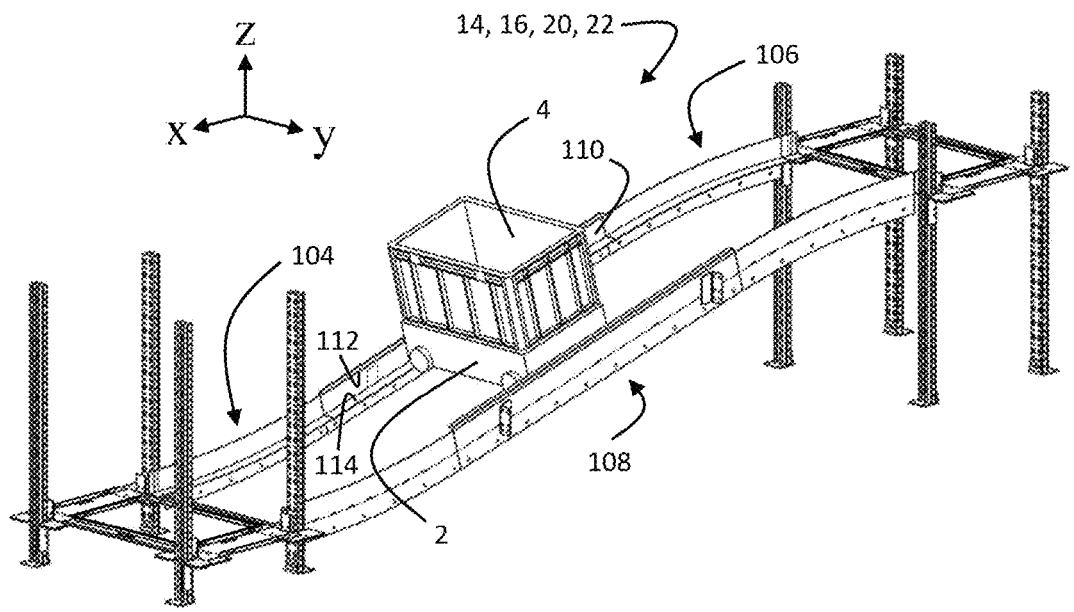
FIG. 35a is a perspective view of another embodiment of a one-way ramp of an embodiment of the present disclosure.
Figure 35B:
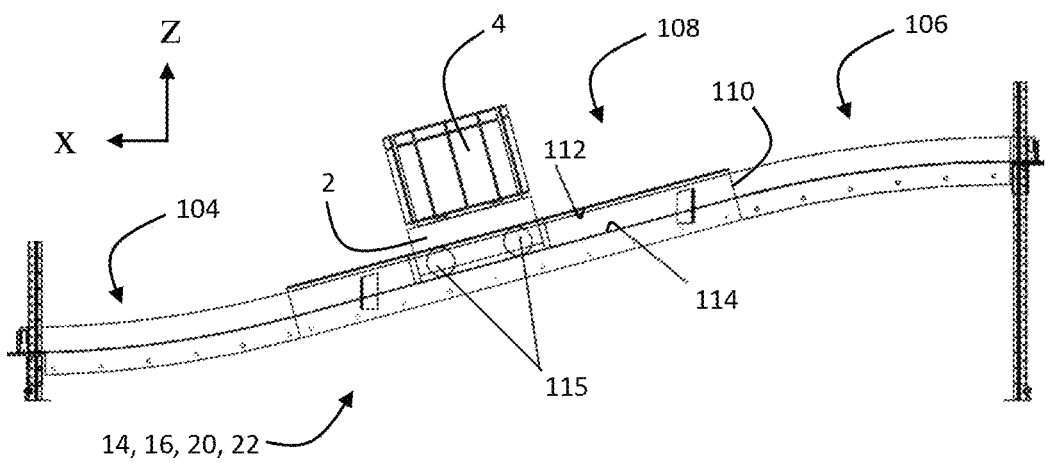
FIG. 35b is a front view of the other embodiment of a one-way ramp of an embodiment of the present disclosure.

FIG. 30 shows a front view of an automated storage and retrieval system according to the embodiment shown in FIG. 5. The front view shows the distribution of storage sites 4 and aisles 9 along the racks of the rack arrangement 1.

FIGS. 31 to 34 shows a schematic of paths along a track arrangement 1 depending on the position of the entry point 27 and exit point 28. In each embodiment, depending on the occupancy of the system, a path with the minimum number of 180-degree turns may be chosen. Preferably, in each embodiment, 180-degree turns of each path, as far as they are necessary, are located only at the lateral ends of the track arrangement 1, i.e. at track column No. 1 and No. X. The shown track arrangement 1 has 9 track levels, 5 track columns, wherein the ramps are distributed as described before in two track rows.

The track arrangements 1 according to FIGS. 31 to 34 each comprise a first sequence of first ramps track 13 with a plurality of first one-way ramps 14, a second sequence of second ramps 15 with a plurality of second one-way ramps 16, a third sequence of third ramps 19 with a plurality of third one-way ramps 20, and a fourth sequence of fourth ramps 21 with a plurality of fourth one-way ramps 22. The one-way ramps 14, 16, 20, 22 and their driving directions are indicated by arrows pointing towards or away from the interaction site 10.

According to the embodiment of FIGS. 31 to 34, an upward path and a downward path may include one or more 180-degree turns, preferably at the lateral end track columns.

In any embodiment, it is also possible that a carriage 2 transports an object 4 from one storage site 5 to another storage 5 of the track arrangement 1 without passing an interaction site 10.

Any of the described track arrangements 1 is arranged so that the track arrangement 1 can be extended arbitrarily by reproducing the shown track arrangement 1 and/or a section thereof transverse to the aisle direction I, i.e., in the first driving direction II, periodically. This makes the track arrangement 1 modular and adaptable to the size of the rack arrangement 3.

FIG. 10a,b show another embodiment of a one-way ramp 14, 16, 20, 22. The ramp 14, 16, 20, 22 in FIG. 10a,b comprises a maximum slope angle of approximately 15 degrees. The ramps 14, 16, 20, 22 comprise a lower concave portion 104 with a smoothly upwardly rising slope angle and an upper convex portion 106 with a smoothly upwardly falling slope angle. There is also a straight portion 108 with a constant maximum slope angle arranged between the lower concave portion 104 and the upper convex portion 106. The lateral end points of the ramps 14, 16, 20, 22 have essentially zero slope angle where they connect to the connection points 24. This shape allows for a smooth change of the track level and reduces the risk of tipping over for the carriage 2 carrying the object 4 in form of a container.

The ramp 14, 16, 20, 22 further comprise securing rails 110 comprising a securing surface 112 facing essentially downward and arranged at a distance to a running surface 114 on which the wheels 115 of the carriage 2 run. The distance is slightly larger than the diameter of those wheels of the carriage 2 that extend forwardly and backwardly out of the contour of the of the carriage 2, so that these are able to run on the running surface 114 below the securing surface 112. The securing rails 110 have here a C-profile partly embracing the wheels of the carriage 2. The securing rails 110 here extend along the straight portion 108 having the constant maximum slope angle so that tipping over of the carriage 2 is prevented where the slope angle is largest. If the carriage 2 carrying the container 4 starts tipping over, for instance due to momentum of container load sliding downwards within the container 4, the wheels of the carriage 2 may shortly lift off from the running surface 114 to abut against the securing surface 112. The wheels of the first wheel set 37 will then return downwards to run on the running surface 114 again. Thus, the securing rails 110 secure the carriage 2 on steep portions of the ramps 14, 16, 20, 22.

Where, in the foregoing description, integers or elements are mentioned which have known, obvious or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional, preferable, advantageous, convenient or the like are optional and do not limit the scope of the independent claims.

The above embodiments are to be understood as illustrative examples of the disclosure. It is to be understood that any feature described in relation to any one embodiment may be used alone, or in combination with other features described, and may also be used in combination with one or more features of any other of the embodiments, or any combination of any other of the embodiments. While at least one exemplary embodiment has been shown and described, it should be understood that other modifications, substitutions and alternatives are apparent to one of ordinary skill in the art and may be changed without departing from the scope of the subject matter described herein, and this application is intended to cover any adaptations or variations of the specific embodiments discussed herein.

In addition, "comprising" does not exclude other elements or steps, and "a" or "one" does not exclude a plural number. Furthermore, characteristics or steps which have been described with reference to one of the above exemplary embodiments may also be used in combination with other characteristics or steps of other exemplary embodiments described above. Method steps may be applied in any order or in parallel or may constitute a part or a more detailed version of another method step. It should be understood that there should be embodied within the scope of the patent warranted hereon all such modifications as reasonably and properly come within the scope of the contribution to the art. Such modifications, substitutions and alternatives can be made without departing from the spirit and scope of the disclosure, which should be determined from the appended claims and their legal equivalents.

While specific embodiments of the invention have been shown and described in detail to illustrate the application of the principles of the invention, it will be understood that the invention may be embodied otherwise without departing from such principles.

LIST OF REFERENCE CHARACTERS 1 track arrangement
2 carriages
3 storage rack arrangement
4 objects
5 storage site
6 rack
7 storage level
8 aisle track
9 aisle
10 interaction site
11 first horizontal one-way track
12 second horizontal one-way track
13 first sequence of first ramps
14 first one-way ramp
15 second sequence of second ramps
16 second ramp
17 entry point level
18 exit point level
19 third sequence of third ramps
20 third one-way ramp
21 fourth sequence of fourth ramps
22 fourth one-way ramp
24 connection point
25 automated storage and retrieval system
26 interaction track
27 entry point
28 exit point
30 bidirectional horizontal track
31 connection track
32 front face
33 holding track
104 lower concave portion
106 upper convex portion
108 straight portion
110 securing rails
112 securing surface
114 running surface
115 wheels of the carriage
I aisle direction
II first driving direction
III second driving direction
X number of track columns
Y number of track rows
Z number of track levels

The invention claimed is:

1. A track arrangement for self-driven carriages in a storage rack arrangement for automatically storing and accessing objects, the storage rack arrangement comprises a plurality of storage sites arranged in at least one rack extending over k storage levels, wherein the track arrangement connects each storage level with at least one interaction site for automatically processing stored objects and/or automatically issuing objects to be stored, the track arrangement comprising:

a plurality of interaction sites;
at least Z track levels, wherein $Z \geq k$,
an entry point on the $m^{th}$ track level for one of the interaction sites, wherein $m \in \{1, \ldots, Z\}$, and
an exit point on the nth track level for one of the one of the interaction sites, wherein $n \in \{1, \ldots, Z\}$, wherein the track arrangement further comprises for each interaction site:
$Z-m$ first one-way ramps directed downward towards the entry point,
$m-1$ second one-way ramps directed upward towards the entry point,
$Z-n$ third one-way ramps directed upward away from the exit point, and
$n-1$ fourth one-way ramps directed downward away from the exit point, wherein one first sequence of first ramps, one second sequence of second ramps, one third sequence of third ramps and one fourth sequence of fourth ramps is unambiguously associated with exactly one interaction site.

2. The track arrangement according to claim 1, wherein for each interaction site, the entry point and the exit point are arranged at the same track level.

3. The track arrangement according to claim 1, wherein one or more of the first one-way ramps, of the second one-way ramps, of the third one-way ramps, and/or of the fourth one-way ramps are arranged to connect adjacent track levels with each other.

4. The track arrangement according to claim 1, wherein one or more of the first one-way ramps, of the second one-way ramps, of the third one-way ramps, and/or of the fourth one-way ramps are arranged to connect next-nearest track levels with each other.

5. The track arrangement according to claim 1, further comprising at least one bidirectional horizontal track on each storage level.

6. The track arrangement according to claim 1, further comprising a first horizontal one-way track on each storage level with a first driving direction.

7. The track arrangement according to claim 6, further comprising a second horizontal one-way track on each storage level with a second driving direction opposite to the first direction.

8. The track arrangement according to claim 1, wherein
subsequent first one-way ramps are connected to each other by one or two horizontal connection points, and/or
subsequent second one-way ramps are connected to each other by one or two horizontal connection points, and/or
subsequent third one-way ramps are connected to each other by one or two horizontal connection points, and/or
subsequent fourth one-way ramps are connected to each other by one or two horizontal connection points.

9. The track arrangement according to claim 1, wherein the track arrangement is arranged on a three-dimensional grid with the Z track levels, Y track rows and X track columns, wherein connection points define grid points of the three-dimensional grid and the ramps are arranged in at least one track row, between adjacent or second-nearest track columns to connect adjacent track levels or second-nearest track levels with each other.

10. The track arrangement according to claim 1, further comprising a one-way interaction track to connect the entry point of the interaction site with the at least one interaction site and the at least one interaction site with the exit point of the interaction site.

11. An automated storage and retrieval system comprising:
the track arrangement according to claim 1; and
at least one self-driven carriage configured to drive along a defined first path along the one-way ramps of the track arrangement for automatically transporting a stored object from a storage site to an interaction site and/or to drive along a defined second path along the one-way ramps of the track arrangement for automatically transporting an object from the interaction site to a storage site.

12. The automated storage and retrieval system as claimed in claim 11, wherein the track arrangement is arranged at a front face of the storage rack arrangement.

13. An automated storage and retrieval method comprising the steps of:
retrieving a stored object from a storage site by a self-driven carriage, wherein the storage site is located in a storage rack arrangement comprising a plurality of storage sites being arranged in at least two racks extending over a plurality of storage levels, wherein the storage sites are accessible by horizontal aisle tracks on each storage level, wherein the aisle tracks extend in an aisle direction along aisles between the racks,
transporting the object from the storage site by the self-driven carriage via first one-way ramps and/or second one-way ramps to an entry point of one of a plurality of interaction sites for automatically processing the stored object, and/or
transporting the object from an exit point of the interaction site by the self-driven carriage via third one-way ramps and/or fourth one-way ramps to one of the storage sites for automatically storing the object, wherein one first sequence of first ramps, one second sequence of second ramps, one third sequence of third ramps and one fourth sequence of fourth ramps is unambiguously associated with exactly one interaction site.

14. The automated storage and retrieval method as claimed in claim 13, further comprising:
determining a route of a carriage between one of the interaction sites and a storage site, and/or between a storage site and an interaction point by determining a sequence of connection points and tracks of the track arrangement that are to be traversed by said carriage.

* * * * *